(12) United States Patent
Yuki et al.

(10) Patent No.: US 10,041,588 B2
(45) Date of Patent: Aug. 7, 2018

(54) WORKING MACHINE

(71) Applicant: HONDA MOTOR CO., LTD., Tokyo (JP)

(72) Inventors: Toru Yuki, Wako (JP); Yoshihisa Hirose, Wako (JP); Hiroo Kanke, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 22 days.

(21) Appl. No.: 15/286,950

(22) Filed: Oct. 6, 2016

(65) Prior Publication Data

US 2017/0114894 A1   Apr. 27, 2017

(30) Foreign Application Priority Data

Oct. 23, 2015   (JP) ................. 2015-208770

(51) Int. Cl.
*F16H 61/662* (2006.01)
*F16H 9/18* (2006.01)
(Continued)

(52) U.S. Cl.
CPC ....... *F16H 61/66236* (2013.01); *B60W 10/06* (2013.01); *B60W 10/107* (2013.01);
(Continued)

(58) Field of Classification Search
CPC ............... F16H 61/66236; F16H 2061/66213
See application file for complete search history.

(56) References Cited

U.S. PATENT DOCUMENTS

2002/0033298 A1   3/2002   Ono et al.
2007/0022636 A1   2/2007   Wakitani et al.
(Continued)

FOREIGN PATENT DOCUMENTS

EP   1188960 A2   3/2002
JP   H5-060192   3/1993
(Continued)

OTHER PUBLICATIONS

Extended European Search Report dated May 12, 2017, 7 pages.

*Primary Examiner* — Ramya Prakasam Burgess
*Assistant Examiner* — Timothy Hannon
(74) *Attorney, Agent, or Firm* — Rankin, Hill & Clark LLP

(57) ABSTRACT

A working machine having a belt-type continuously variable transmission in a working power transmission system includes a target working speed setting section for optionally setting a target working rotational speed of a working unit, a working unit speed sensor that detects an actual working rotational speed of the working unit, a speed reduction ratio regulation mechanism that regulates a minimum speed reduction ratio of a rotational speed of a driven pulley with respect to a drive pulley, and a control unit. The control unit controls a drive source rotational speed to bring the actual working rotational speed close to the target working rotational speed, obtains a minimum limit speed reduction ratio based upon a target minimum rotational speed of a drive source and the target working rotational speed, and controls the speed reduction ratio regulation mechanism to keep the minimum limit speed reduction ratio.

8 Claims, 13 Drawing Sheets

(51) Int. Cl.
*E01H 5/09* (2006.01)
*B60W 30/188* (2012.01)
*B60W 10/107* (2012.01)
*B60W 10/06* (2006.01)
*F16H 9/12* (2006.01)

(52) U.S. Cl.
CPC ......... *B60W 30/1884* (2013.01); *E01H 5/098* (2013.01); *F16H 9/12* (2013.01); *F16H 9/18* (2013.01); *F16H 61/662* (2013.01); *F16H 61/66259* (2013.01); *B60W 2520/10* (2013.01); *B60W 2710/0644* (2013.01); *B60W 2710/1005* (2013.01); *F16H 2061/66213* (2013.01)

(56) References Cited

U.S. PATENT DOCUMENTS

2014/0129101 A1* 5/2014 Tokura .............. F16H 61/66259
　　　　　　　　　　　　　　　　　　　　　701/60
2014/0332307 A1 11/2014 Larson et al.
2015/0148156 A1* 5/2015 Yasui ................ F16H 61/66259
　　　　　　　　　　　　　　　　　　　　　474/11

FOREIGN PATENT DOCUMENTS

JP　　　　H5-40096　　　5/1993
WO　　　2014/182953 A1　11/2014

* cited by examiner

WORKING MACHINE

INCORPORATION BY REFERENCE

The present application claims priority under 35 U.S.C. § 119 to Japanese Patent Application No. 2015-208770 filed on Oct. 23, 2015. The content of the application is incorporated herein by reference in its entirety.

BACKGROUND OF THE INVENTION

Field of the Invention

The present invention relates to a technical improvement of a working machine in which a belt-type continuously variable transmission is interposed in a working power transmission system from a drive source to a working unit.

Description of the Related Art

A belt-type continuously variable transmission for a working machine is a transmission capable of continuously changing a speed reduction ratio of a driven pulley to a drive pulley. In order to enhance the working efficiency of a working machine and the degree of freedom of work, it is preferable that a worker can optionally regulate the working speed of the working unit, and the traveling speed of the traveling unit.

As a working machine like this, an auger snowplow is cited, for example. A general auger snowplow can scrape up snow by the auger at a front part while traveling forward by a power source, and blow the snow which is scraped up to a distance via a chute by a blower. A load that is applied to the auger and the blower, that is, the load on the snow removal working unit successively changes due to various factors such as the density of snow, a snow removal height, and a snow throwing distance. In this relation, the art in which a belt-type continuously variable transmission is interposed in a working power transmission system from a drive source to a snow removal working unit is known from Japanese Utility Model Laid-Open No. 05-040096.

The belt-type continuously variable transmission known in Japanese Utility Model Laid-Open No. 05-040096 is composed of a drive pulley that is provided at an output shaft of an engine, a driven pulley that is provided at a drive shaft of an auger and a blower, a V-belt that is laid between the drive pulley and the driven pulley, and a tension pulley that is located in the middle of the V-belt. The driven pulley is composed of a fixed sheave provided at the drive shaft, a movable sheave displaceable in an axial direction with respect to the fixed sheave, and a spring that urges the movable sheave to the fixed sheave. The tension pulley is driven by a hydraulic cylinder to advance and retreat with respect to the V-belt.

A worker optionally operates an operation unit in accordance with the quality of snow to be removed. A control device extends and contracts the piston of the hydraulic cylinder by performing drive control of a hydraulic pump in accordance with the operation signal of the operation unit. When the piston extends, and thereby the tension pulley presses the V-belt, the tension of the V-belt increases. In accordance with increase in tension, the movable sheave alienates in the axially longitudinal direction with respect to the fixed sheave. When the piston contracts, and thereby the pressing force to the V-belt by the tension pulley reduces, the tension of the V-belt decreases. In accordance with decrease in the tension, the movable sheave moves closer to the fixed sheave. In this manner, in accordance with the displacement amount of the movable sheave to the fixed sheave, an effective diameter of the driven pulley changes. As a result, the speed reduction ratio of the driven pulley to the drive pulley can be continuously changed.

The driven pulley of an ordinary belt-type continuously variable transmission is provided with a well-known torque cam mechanism. The torque cam mechanism converts a part of torque that is transmitted to the movable sheave from the V-belt into thrust, and is known from Japanese Patent Laid-Open No. 05-060192, for example. It is preferable to also provide the torque cam mechanism in the belt-type continuously variable transmission which is known by Japanese Utility Model Laid-Open No. 05-040096. A belt-type continuously variable transmission can smoothly perform a displacement operation of the movable sheave by including the torque cam mechanism.

However, in a densely built-up residential area, a careful operation is required so that thrown snow does not enter the grounds of adjacent houses. The worker frequently needs to adjust the snow throwing direction and the snow throwing angle of the chute, and the operation is troublesome. In this way, in order to enhance the snow removing workability of the auger type snowplow, there is yet room for further improvement. The same also applies to various working machines.

Further, when the load of the working unit abruptly increases in this way, the speed reduction ratio temporarily increases (is in a low speed range). That is, the actual working rotational speed of the working unit temporarily becomes low. As a result, a burden of the drive source can be reduced. Meanwhile, when the load on the working unit is abruptly decreased, the speed reduction ratio temporarily decreases (is in a high speed range). That is, the actual working rotational speed of the working unit temporarily becomes high.

When the speed reduction ratio is small, the drive force which is transmitted to the movable sheave from the drive source by the belt is small. If the load is abruptly increased, when the speed reduction ratio is in a small state, the load which acts on the driven shaft at which the fixed sheave is provided can exceed the drive force which is transmitted to the movable sheave from the drive source. In order to perform slide displacement of the movable sheave by the torque cam mechanism smoothly even in the case like this, there is yet room for improvement. In order to perform work by the working unit more smoothly when the drive source is configured by an engine, for example, it is more preferable that occurrence of an engine stall can be prevented.

The present invention has an object to provide an art that can optionally regulate a working rotational speed of a working unit, and can perform stable work by the working unit, in a working machine including a belt-type continuously variable transmission.

SUMMARY OF THE INVENTION

According to the present invention, a working machine includes a belt-type continuously variable transmission. The belt-type continuously variable transmission is interposed in a working power transmission system from a drive source to a working unit. A driven pulley of the belt-type continuously variable transmission includes a fixed sheave, a movable sheave displaceable in an axial direction with respect to the fixed sheave, an urging member that urges the movable sheave toward the fixed sheave, and a torque cam mechanism that converts a part of a rotational force that acts on the movable sheave into a thrust that presses a side surface of a belt.

The working machine has a target working speed setting section that optionally sets a target working rotational speed of the working unit, a working unit speed sensor that detects an actual working rotational speed of the working unit, a speed reduction ratio regulation mechanism that regulates a minimum speed reduction ratio of a rotational speed of the driven pulley to a drive pulley, and a control unit that controls the drive source and the speed reduction ratio regulation mechanism.

The control unit is configured to (1) control a rotational speed of the drive source so as to bring the actual working rotational speed detected by the working unit speed sensor close to the target working rotational speed, (2) obtain a minimum limit speed reduction ratio on the basis of a target minimum rotational speed of the drive source, which is set in advance or optionally set by a drive minimum speed setting section, and the target working rotational speed of the working unit, and (3) control the speed reduction ratio regulation mechanism to keep the obtained minimum limit speed reduction ratio.

Consequently, a worker can optionally set the target working rotational speed of the working unit by operating the target working speed setting section. The control unit brings the actual working rotational speed of the working unit close to the target working rotational speed by controlling the rotational speed of the drive source. Accordingly, the working rotational speed of the working unit can be optionally and easily adjusted, and an optimal working situation can be made.

The load on the working unit can always vary in accordance with the working situation. The speed reduction ratio of the driven pulley to the drive pulley changes in accordance with variation of load, by action of the torque cam mechanism and the urging member. For example, when the load on the working unit is abruptly increased, the speed reduction ratio temporarily increases (is in a low speed range). That is, the actual working rotational speed of the working unit temporarily becomes a low speed. As a result, the load on the drive source can be reduced.

Meanwhile, when the load on the working unit is abruptly decreased, the speed reduction ratio temporarily decreases (is in a high speed range). That is, the actual working rotational speed of the working unit temporarily becomes a high speed. When the speed reduction ratio is small, the drive force which is transmitted to the movable sheave from the drive source by the belt is small. If the load is abruptly increased, when the speed reduction ratio is in a small state, the load that acts on the driven shaft where the fixed sheave is provided can exceed the drive force which is transmitted to the movable sheave from the drive source. In order to perform slide displacement of the movable sheave by the torque cam mechanism smoothly even in that case, there is yet room for improvement. For example, in order to perform work by the working unit more smoothly when the drive source is configured by an engine, it is more preferable that occurrence of an engine stall can be prevented.

In relation to this, in the present invention, the control unit controls the speed reduction ratio regulation mechanism to keep the minimum limit speed reduction ratio which is obtained on the basis of both the target minimum rotational speed of the drive source and the target working rotational speed. Consequently, the minimum limit speed reduction ratio of the driven pulley to the drive pulley can be regulated by the speed reduction ratio regulation mechanism.

That is, the target minimum rotational speed of the drive source is practically set at a minimum speed at which the drive source can operate stably. The value of the target minimum rotational speed is kept constant as long as the value is not changed. When the target minimum rotational speed is constant, the minimum limit speed reduction ratio is kept. Further, when the target working rotational speed of the working unit is constant, decrease of the minimum limit speed reduction ratio is restricted. Even when the target minimum rotational speed of the drive source is constant, if the target working rotational speed is changed, the minimum limit speed reduction ratio changes in accordance with a change amount of the target working rotational speed.

In this way, the minimum limit speed reduction ratio is regulated so as not to be excessively low. In accordance with an abrupt increase of the load on the working unit, the rotational speed of the drive source can be temporarily reduced. Even when the rotational speed of the drive source is abruptly reduced to the target minimum rotational speed, the load acting on the driven shaft where the fixed sheave is provided can be prevented from exceeding the drive force which is transmitted from the drive source to the movable sheave. Accordingly, slide displacement of the movable sheave by the torque cam mechanism can be performed smoothly.

As above, the actual working rotational speed of the working unit is controlled to be close to (including corresponding to) the optional target working rotational speed which is adjusted by the worker. The speed reduction ratio can automatically displace in accordance with a load to the maximum speed reduction ratio which is allowed by the torque cam mechanism from the minimum limit speed reduction ratio. Accordingly, response can be made to the load on the working unit abruptly varying, and stable work by the working unit can be performed. In addition, the target working speed setting section only has to be operated, and therefore, the rotational speed of the working unit can be easily operated.

A characteristic of the minimum limit speed reduction ratio is preferably a characteristic that decreases as the target minimum rotational speed of the drive source becomes smaller, and increases as the target working rotational speed becomes smaller.

Consequently, as the set amount of the target rotational speed setting section is smaller, that is, as the target working rotational speed of the working unit is smaller, the minimum limit speed reduction ratio which is regulated by the speed reduction ratio regulation mechanism is larger. Accordingly, even when the rotational speed of the power source is abruptly increased by the load abruptly decreasing during work, the rotational speed of the working unit can be restrained from abruptly increasing, because the minimum limit speed reduction ratio is large.

It is preferable that the speed reduction ratio regulation mechanism has a regulation adjustment member that is displaceable to adjust an allowable range in which alienation in an axial direction of the movable sheave with respect to the fixed sheave is possible, and a regulation drive section that drives the regulation adjustment member, and the control unit is configured to control the regulation drive section in the speed reduction ratio regulation mechanism.

Consequently, by controlling the regulation drive section by the control unit, the regulation adjustment member can be displaced by the regulation drive section. The regulation adjustment member can be configured separately from the regulation drive section. Accordingly, the regulation drive section can be disposed in a vacant space in the belt-type continuously variable transmission, and therefore, the degree of freedom of disposition can be enhanced more. In addition, the regulation adjustment member can be disposed so that the allowable range in which alienation in the axial direction of the movable sheave with respect to the fixed sheave is possible can be easily and accurately adjusted.

The working machine preferably further has a manual type mode changeover switch, and a drive source operation member that manually operates a rotational speed of the drive source. The control unit is configured to control the drive source, the working unit and the speed reduction ratio regulation mechanism on the basis of a plurality of control modes which are set in advance to be switchable by the mode changeover switch. The plurality of control modes include a first control mode and a second control mode. The first control mode controls the drive source, the working unit and the speed reduction ratio regulation mechanism by setting of the target working speed setting section. The second control mode controls the rotational speed of the drive source in accordance with an operation amount of the drive source operation member.

In this way, the control unit controls the drive source, the working unit and the speed reduction ratio regulation mechanism on the basis of the respective control modes switched by the mode changeover switch. Consequently, the worker can make the working content corresponding to preference by optionally selecting a plurality of control modes in accordance with the level of skill of work and a working situation.

In the present invention, the worker can optionally adjust the working rotational speed of the working unit, and can perform stable work by the working unit, by operating the target working speed setting section.

DETAILED DESCRIPTION OF THE PREFERRED EMBODIMENT

A mode for carrying out the present invention will be described hereinafter based on the accompanying drawings.

Embodiment

A belt-type continuously variable transmission for a working machine according to an embodiment will be described on the basis of the drawings. A working machine loaded with the belt-type continuously variable transmission for the working machine is configured by a walking type auger snowplow, for example. Note that the working machine is not limited to a walking type auger snowplow. A "front", "rear", "left", "right", "top" and "down" are in accordance with a direction seen from a worker. Fr represents a front side, Rr represents a rear side, Le represents a left side, and Ri represents a right side.

Figure 1:
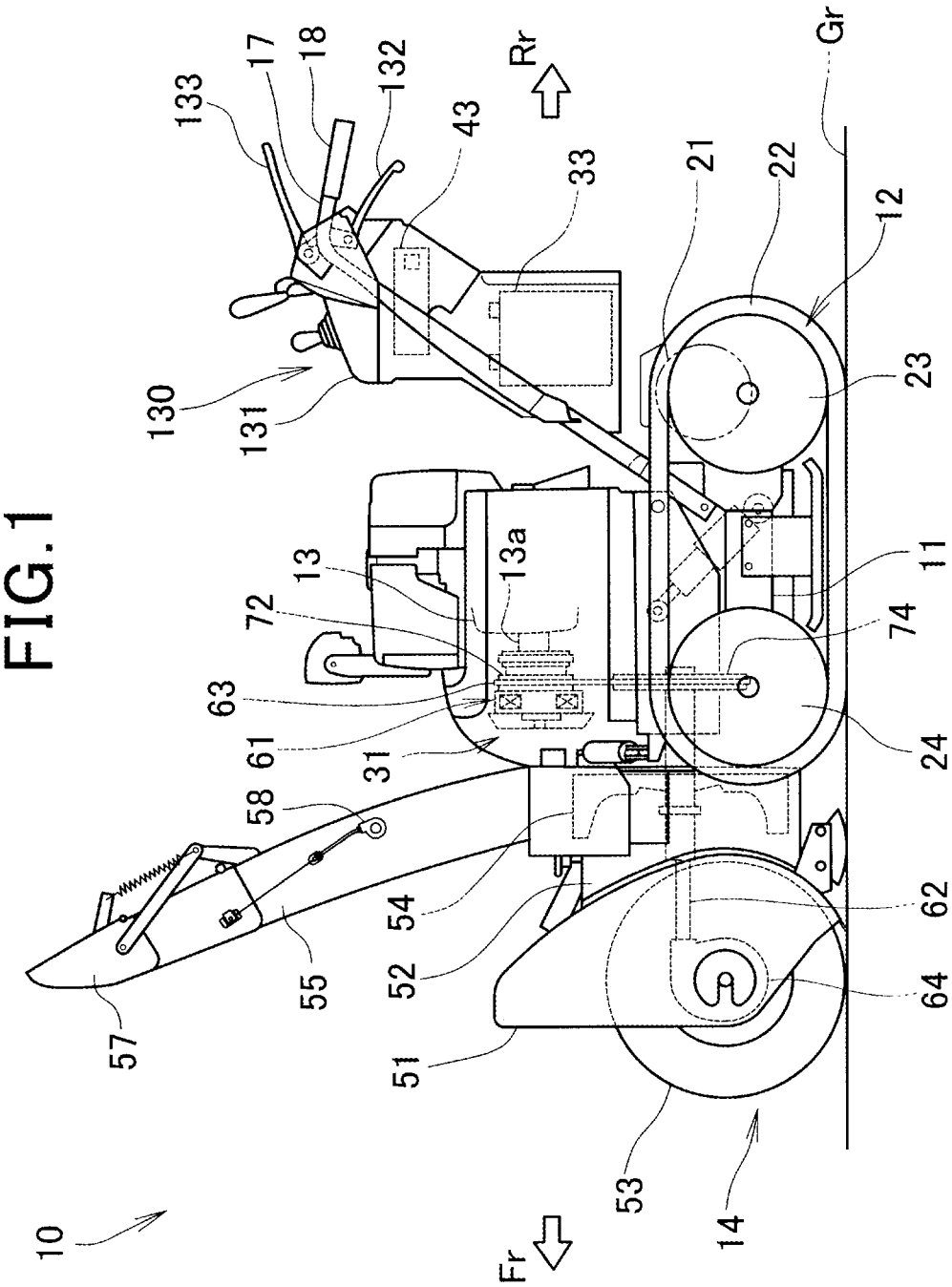
FIG. 1 is a side view of a working machine loaded with a belt-type continuously variable transmission for a working machine according to the present invention.

As shown in FIG. 1, a working machine 10 is a self-propelled auger snowplow (also referred to as a rotary snowplow) including a track frame 11 configuring a machine body of the entire working machine 10, a left and right traveling devices 12 equipped at the track frame 11, a drive source 13 and a working unit 14 which are integrally attached to the track frame 11.

At a rear part of the track frame 11, a left and right operation handles 17 that extend to an upper rear side are integrally attached. A left and right grips 18 are attached to distal ends of the left and right operation handles 17. A worker can steer the working machine 10 by the operation handles 17 while walking with the working machine 10.

The left and right traveling devices 12 are crawler type traveling devices which are composed of a left and right electric motors 21, a left and right crawler belts 22, a left and right drive wheels 23 disposed at a rear part, and a left and right rolling wheels 24 which are disposed at a front part. By drive forces of the left and right electric motors 21, the left and right crawler belts 22 can be driven via the left and right drive wheels 23.

Figure 2:
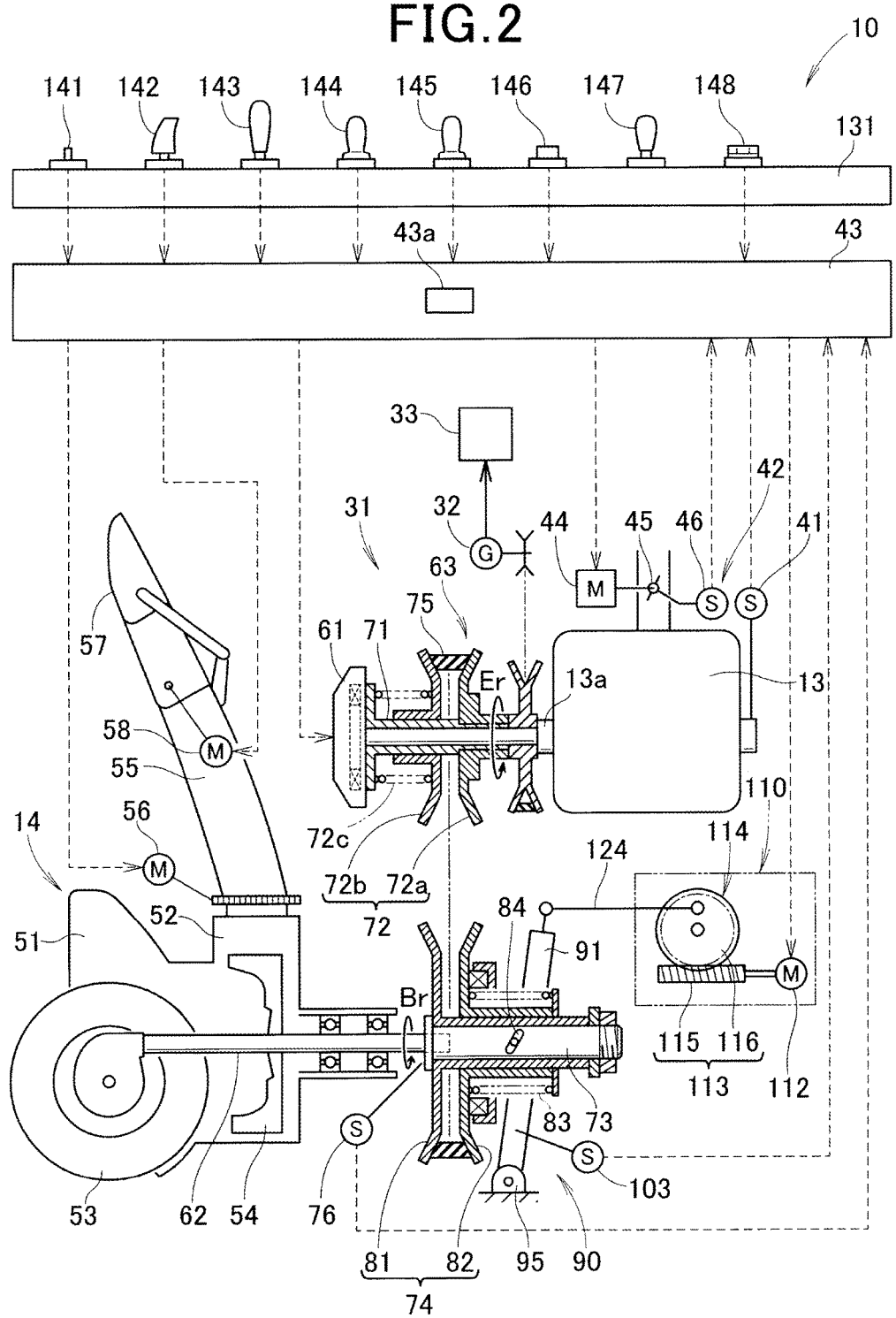
FIG. 2 is a schematic diagram of a drive source, a working unit and a working power transmission system shown in FIG. 1.

As shown in FIGS. 1 and 2, the drive source 13 is configured by an engine, for example. Hereinafter, the drive source 13 will be properly reworded as "the engine 13". The engine 13 drives the working unit 14 via a working power transmission system 31 and rotates a generator 32, supplies obtained electric power to a battery 33, and supplies the electric power to the left and right electric motors 21 and other electric and electronic parts. The left and right electric motors 21 are driven by the electric power generated by the generator 32 and the electric power of the battery 33.

As shown in FIG. 2, a rotational speed Er of the engine 13 is detected by an engine speed sensor 41 (a drive source speed sensor 41). The engine 13 is controlled by an electronic governor 42. The electronic governor 42 (also referred to as the electric governor 42) controls a control motor 44 by a control signal of a control unit 43, and thereby performs opening and closing control of a throttle valve 45 by the control motor 44. An opening degree of the throttle valve 45 is detected by an opening degree sensor 46.

A control system of the working machine 10 is concentrated around the control unit 43. The control unit 43 contains a memory 43a, and is configured to read various kinds of information stored in the memory 43a properly and perform control.

The working unit 14 is composed of an auger housing 51, a blower case 52 which is integrally provided on a rear surface of the auger housing 51, an auger 53 included in the auger housing 51, a blower 54 included in the blower case 52, and a chute 55 that is extended upward from an upper portion of the blower case 52.

The chute 55 is a so-called a snow throwing section at a time of blowing snow which is scraped up by the auger 53 to a location apart from the snow plow 10 by the blower 54. A base end portion of the chute 55 is rotatably attached to the blower case 52 substantially horizontally so as to adjust a snow throwing direction, that is, a compass direction in which snow is thrown. Consequently, the chute 55 is rotatable substantially parallel to a contact surface Gr (refer to FIG. 1) which the traveling devices 12 (refer to FIG. 1) contact. The chute 55 is driven by a chute drive motor 56.

A chute guide 57 is provided at an upper end portion of the chute 55. The chute guide 57 is attached to the upper end portion of the chute 55 to be swingable up and down so as to adjust a snow throwing angle in a vertical direction. The chute guide 57 is driven to swing by a guide drive motor 58.

As shown in FIG. 1, the working machine 10 (the snowplow 10) scrapes up snow by the auger 53 at a front part while traveling forward by the left and right traveling devices 12, and can blow the scraped snow to a distance via the chute 55 by the blower 54.

As shown in FIG. 2, the working power transmission system 31 from the drive source 13 to the working unit 14 is composed of an electromagnetic clutch 61 which is connected to an output shaft 13a of the drive source 13, a rotating shaft 62 connected to the auger 53 and the blower 54, and a belt-type continuously variable transmission 63 for a working machine, which is interposed between the electromagnetic clutch 61 and the rotating shaft 62.

The belt type continuously variable transmission 63 for a working machine (hereinafter, referred to as "the belt type continuously variable transmission 63") includes a drive pulley 72 that is connected to a drive shaft 71, a driven pulley 74 that is connected to the driven shaft 73, and a V-belt 75 that is laid between the drive pulley 72 and the driven pulley 74, and can continuously change a speed reduction ratio of the driven pulley 74 to the drive pulley 72.

The drive shaft 71 is connected to the electromagnetic clutch 61. When the electromagnetic clutch 61 is in an off state, the drive shaft 71 is released with respect to the output shaft 13a of the drive source 13. When the electromagnetic clutch 61 is in an on state, the drive shaft 71 is connected to the output shaft 13a of the drive source 13. Hereinafter, the electromagnetic clutch 61 will be properly reworded as "the auger clutch 61" or "the working unit clutch 61".

The drive pulley 72 includes a fixed sheave 72a that is attached to the drive shaft 71, a movable sheave 72b that is capable of displacing in the axial direction with respect to the fixed sheave 72a, and a coil spring 72c (a drive side coil spring 72c) that urges the movable sheave 72b to the fixed sheave 72a. The movable sheave 72b is supported by the drive shaft 71 to be relatively rotatable with respect to the fixed sheave 72a, and is displaceable in the axial direction of the drive shaft 71 with respect to the fixed sheave 72a. A rotational speed of the drive shaft 71 and the drive pulley 72 is the same as the rotational speed Er of the engine 13.

The driven shaft 73 is located on the same axis as that of the rotating shaft 62, and is connected to one end of the rotating shaft 62. The working unit 14 is connected to the driven shaft 73 via the rotating shaft 62. That is, the auger 53 is connected to the rotating shaft 62 via a worm gear type speed reduction mechanism 64. The blower 54 is connected to the rotating shaft 62. A working rotational speed Br of the working unit 14 (in particular, the blower 54) is the same as a rotational speed Br of the driven shaft 73. The rotational speed Br of the driven shaft 73 is detected by a working unit speed sensor 76. Consequently, the working rotational speed Br of the working unit 14, that is, the working rotational speed Br of the blower 54 is practically detected by the working unit speed sensor 76. Hereinafter, the working rotational speed Br is properly reworded as "the rotational speed Br".

Figure 3:
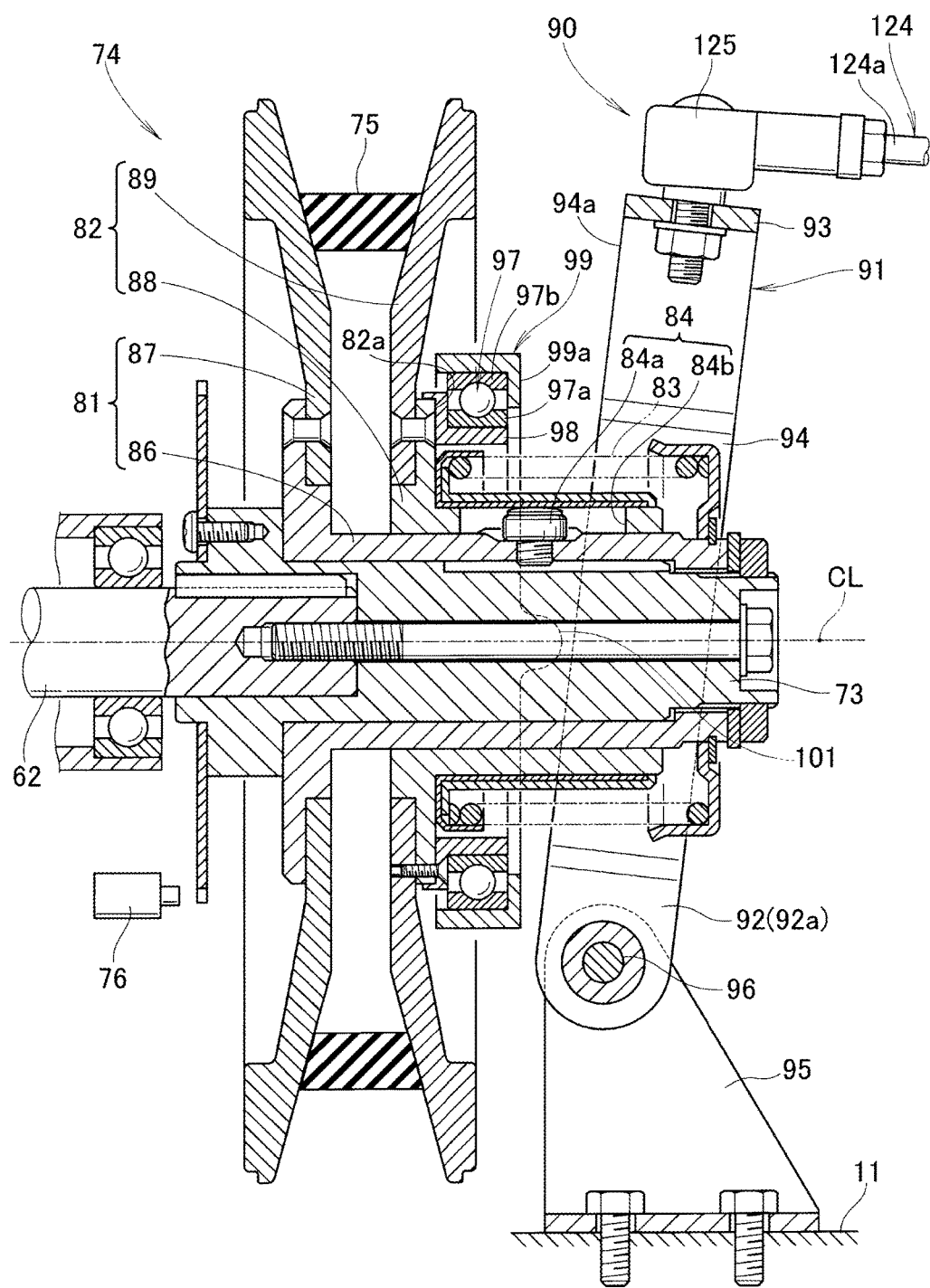
FIG. 3 is a sectional view of a driven pulley and a speed reduction ratio regulation mechanism shown in FIG. 2.

As shown in FIG. 3, the driven pulley 74 includes a fixed sheave 81 which is attached to the driven shaft 73, a movable sheave 82 that is displaceable in an axial direction with respect to the fixed sheave 81, a coil spring 83 (a driven side coil spring 83) that urges the movable sheave 82 to the fixed sheave 81, and a torque cam mechanism 84 that converts a part of a rotational force that acts on the movable sheave 82 into a thrust that presses a side surface of the V-belt 75.

Describing in detail, the fixed sheave 81 is composed of a tubular fixed side boss section 86 which is supported by the driven shaft 73, and a substantially disk-shaped fixed side sheave disk 87 provided at the fixed side boss section 86. The fixed side boss section 86 and the fixed side sheave disk 87 are an integrated product or separate products. The driven shaft 73 is fitted into a through-hole of the tubular fixed side boss section 86. In the fixed side boss section 86, relative rotation with respect to the driven shaft 73 and relative movement in the axial direction are both restricted.

The movable sheave 82 is composed of a tubular movable side boss section 88 which is supported by the fixed side boss section 86, and a substantially disk-shaped movable side sheave disk 89 that is provided at the movable side boss section 88. The movable side boss section 88 and the movable side sheave disk 89 are an integral product or separate products. The fixed side boss section 86 is fitted into a through-hole of the tubular movable side boss section 88. Although the movable side boss section 88 is relatively rotatable and displaceable in the axial direction, with respect to the fixed side boss section 86, displacement of the movable side boss section 88 is regulated by the torque cam mechanism 84.

The coil spring 83 is configured by a compression coil spring. A coil center of the coil spring 83 is located concentrically with a rotation center line CL of the driven pulley 74.

Figure 4:
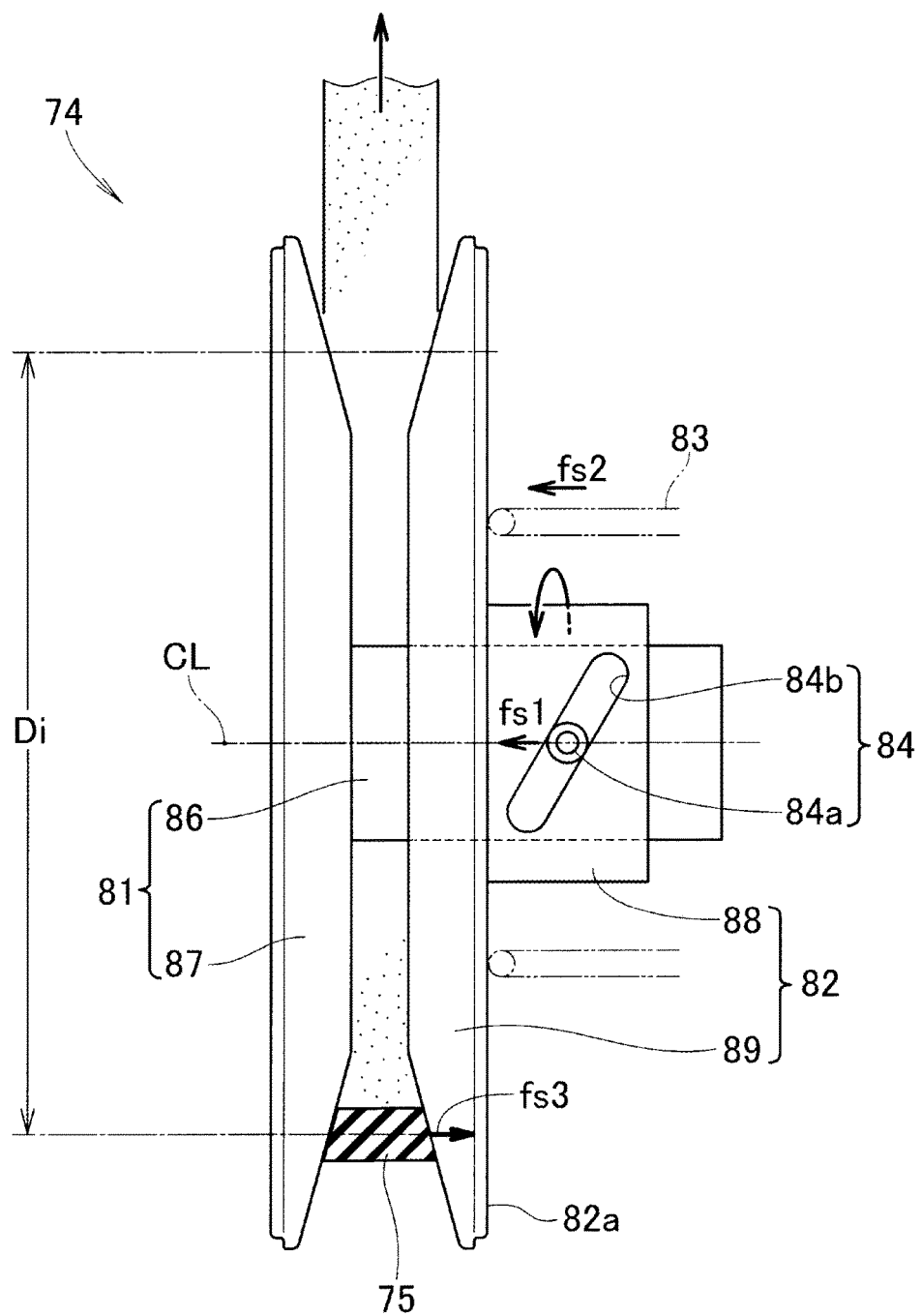
FIG. 4 is a side view of the driven pulley including a torque cam mechanism shown in FIG. 3.

As shown in FIGS. 3 and 4, the torque cam mechanism 84 is composed of one or a plurality of pins 84a that protrude radially outward from the fixed side boss section 86, and one or a plurality of cam grooves 84b which are formed in the movable side boss section 88. The pin 84a is fitted into the cam groove 84b. The cam groove 84b is preferably formed into a long hole shape which penetrates through the movable side boss section 88 in a radial direction, and is inclined in the axial direction of the driven shaft 73 (formed into a spiral shape).

Referring also to FIG. 2, when the engine 13 drives the working unit 14 via the belt-type continuously variable transmission 63, a reaction force corresponding to a magnitude of the load on the working unit 14 acts on the torque cam mechanism 84. Consequently, the cam groove 84b is guided by the pin 84a to slide and displace in the axial direction while rotating. That is, a part of the rotational force which acts on the movable sheave 82 from the engine 13 is converted into a thrust fs1 that presses the side surface of the V-belt 75 by the torque cam mechanism 84. A sum total of the thrust fs1 and an urging force fs2 with which the driven side coil spring 83 urges the movable sheave 82 is Σfs (a total thrust Σfs). The total thrust Σfs and a force fs3 which is to push a belt contact surface of the movable sheave 82 open by the V-belt 75 are balanced, whereby a belt effective diameter Di of the driven pulley 74 is determined. In this way, while Σfs and fs3 are balanced, a speed reduction ratio Ra of the rotational speed Br of the driven pulley 74 to the rotational speed Er of the drive pulley 72, that is, "Ra=Br/Er" is continuously changed automatically.

As shown in FIGS. 2 and 3, the belt type continuously variable transmission 63 has a speed reduction ratio regulation mechanism 90 that regulates a minimum limit speed reduction ratio in a variable range of the speed reduction ratio Ra, of the rotational speed Br of the driven pulley 74 to the rotational speed Er of the drive pulley 72.

Figure 5:
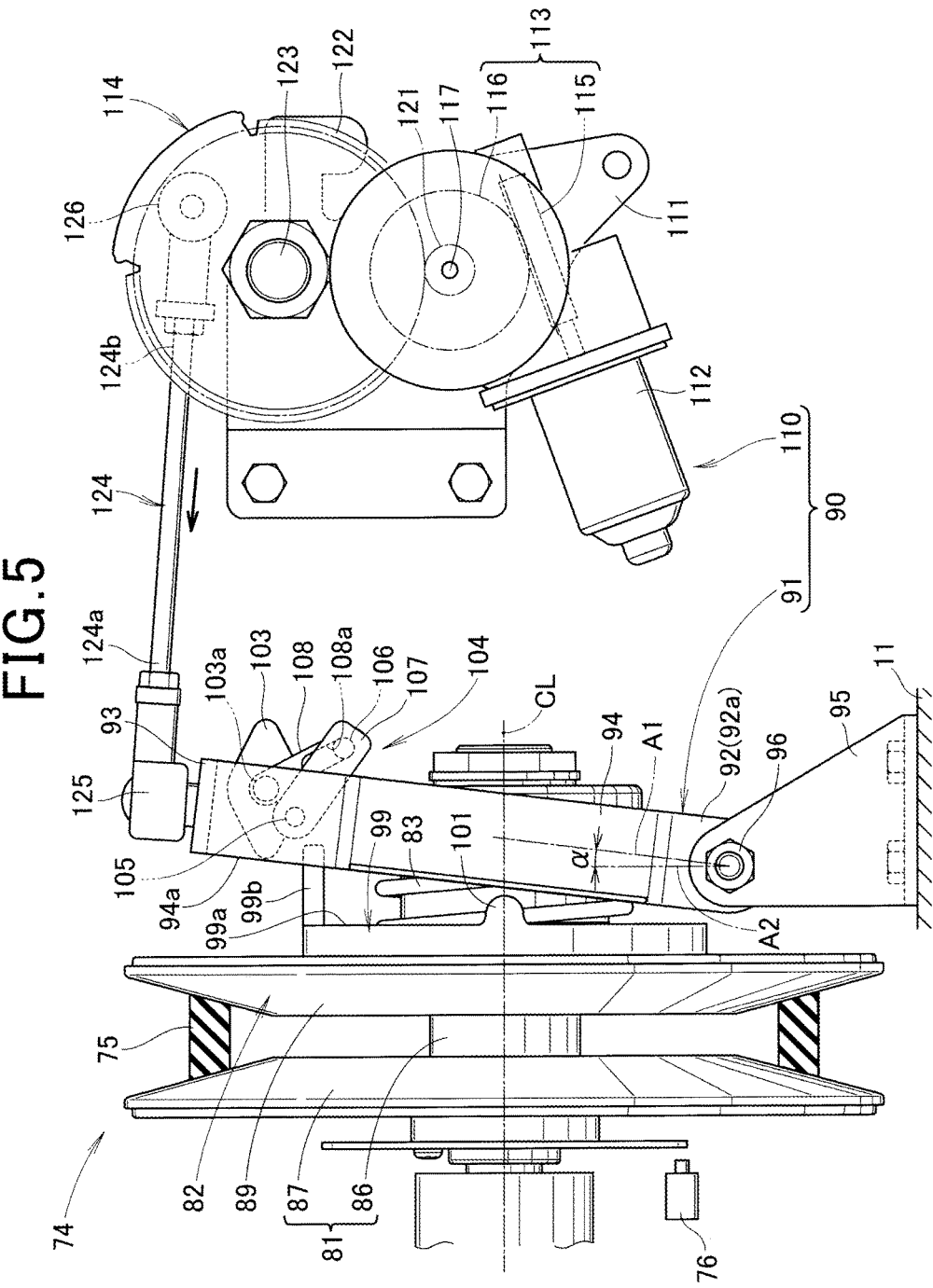
FIG. 5 is an external view of the driven pulley and the speed reduction ratio regulation mechanism shown in FIG. 2.

As shown in FIGS. 3 and 5, the speed reduction ratio regulation mechanism 90 has a swing arm 91 and a regulation drive section 110. The swing arm 91 (the regulation adjustment member 91) is configured to be displaceable so as to adjust an allowable range in which alienation in the axial direction of the movable sheave 82 with respect to the fixed sheave 81 is possible.

The swing arm 91 is located at an opposite side from the fixed sheave 81 with respect to the movable sheave 82. Consequently, the regulation adjustment member 91 can be disposed at the most suitable position for adjusting a range in which maximum alienation displacement of the movable sheave 82 with respect to the fixed sheave 81 is possible.

Further, the swing arm 91 is a long and narrow member which is extended in a direction to intersect a rotation center line CL of the driven pulley 74, and is composed of a swing base end portion 92, a swing distal end portion 93 and a pair of swing intermediate portions 94 and 94.

The swing base end portion 92 is one end portion of the swing arm 91, and is supported by a bracket 95 to be swingable in a direction along the rotation center line CL of the driven pulley 74. The bracket 95 is attached to the track frame 11. The swing distal end portion 93 is an end portion at an opposite side from the swing base end portion 92, in the swing arm 91. The pair of swing intermediate portions 94 and 94 are formed between the swing base end portion 92 and the swing distal end portion 93 in the swing arm 91. The pair of swing intermediate portions 94 and 94 are portions which are located by being separated at both sides radially outward of the coil spring 83, and adjust the allowable range in which alienation in the axial direction of the movable sheave 82 with respect to the fixed sheave 81 is possible.

Figure 6:
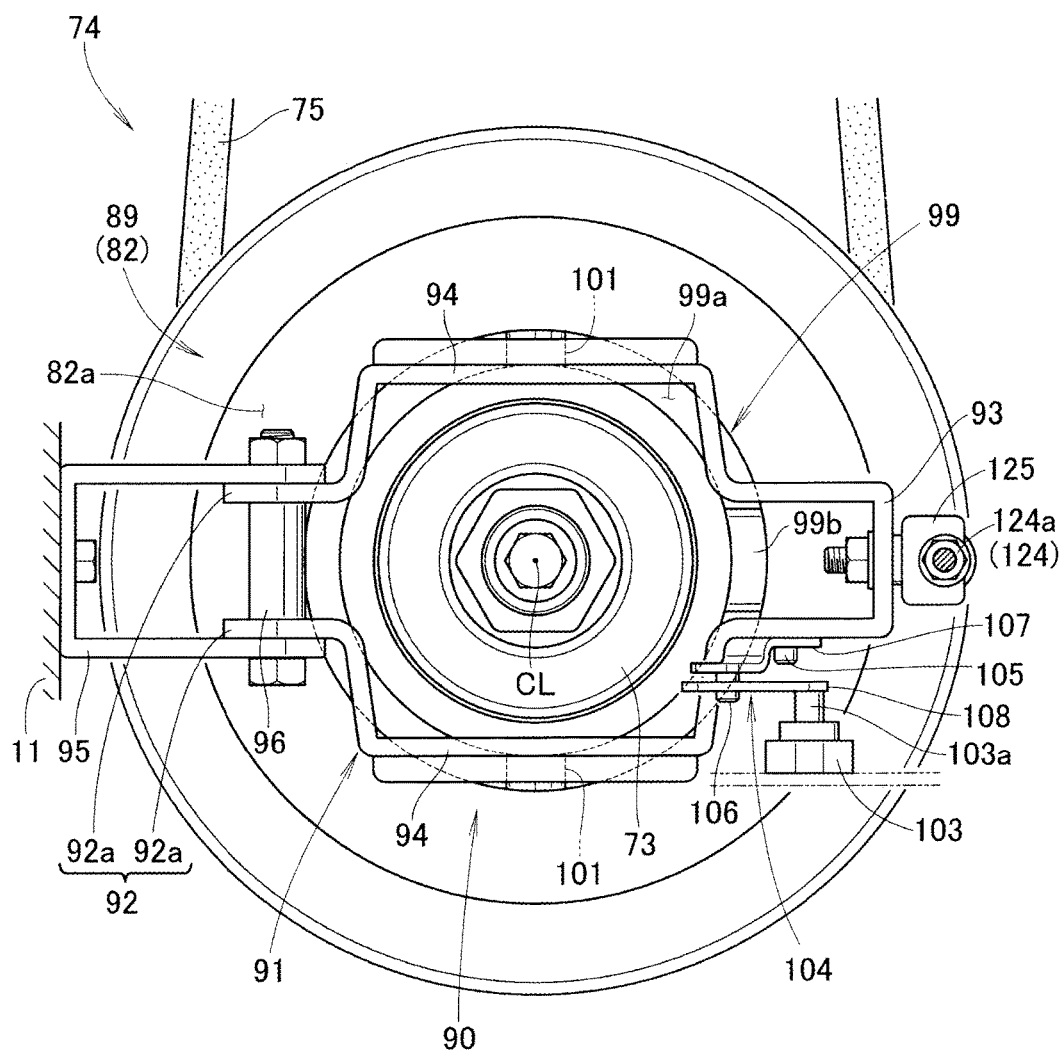
FIG. 6 is a view of the driven pulley and a swing arm shown in FIG. 5, seen from an axial end direction of a driven shaft.
Figure 7:
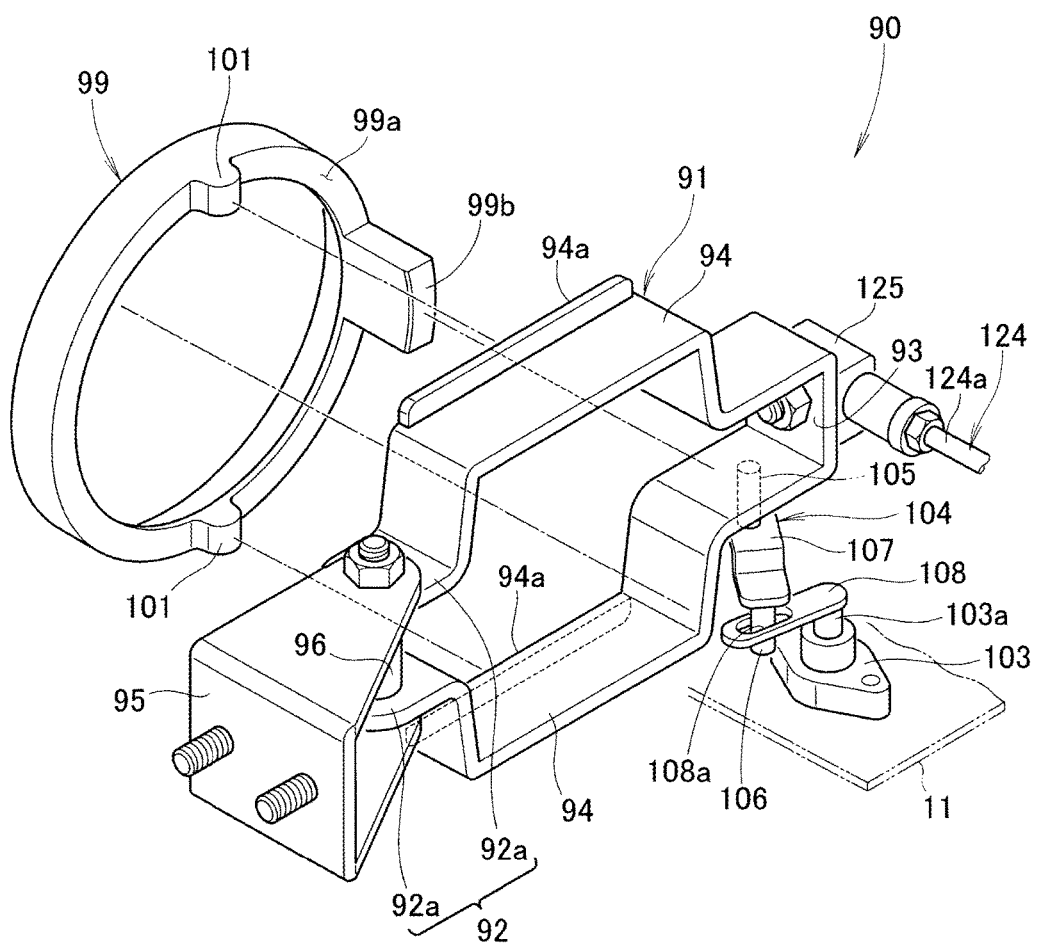
FIG. 7 is an exploded view of the swing arm, a cover, a swing angle detection sensor and a link mechanism shown in FIG. 6.

Describing in more detail, as shown in FIGS. 6 and 7, the swing arm 91 is a fold-formed product of a band plate, and is formed into substantially a U-shape (a fork shape) in which plate surfaces face each other, seen from the axial direction of the driven shaft 73.

The swing base end portion 92 corresponds to a portion of an open end of the U-shape. That is, the swing base end portion 92 is formed by a pair of base end pieces 92a and 92a which separate from each other, and is swingably supported by the bracket 95 by means of a support shaft 96. The swing distal end portion 93 corresponds to a bottom portion of the U-shape. The pair of swing intermediate portions 94 and 94 correspond to intermediate portions of the U-shape. That is, the pair of swing intermediate portions 94 and 94 alienate from each other, and are located to sandwich the driven side coil spring 83 (refer to FIG. 3) from both sides in the radial direction. A space between the pair of base end pieces 92a and 92a is set to be smaller than a space between the pair of swing intermediate portions 94 and 94.

As shown in FIG. 3, the movable sheave 82 has a roller bearing 97 at a side portion 82a facing the pair of swing intermediate portions 94 and 94. The roller bearing 97 is formed by a single row ball bearing. An inner ring 97a of the roller bearing 97 is located concentrically with the rotation center line CL of the driven pulley 74, and is provided at the movable sheave 82. More specifically, an annular inner ring support portion 98 is attached to the side portion 82a of the movable sheave 82. An outer circumferential surface of the inner ring support portion 98 is fitted to the inner ring 97a. As a result, the inner ring 97a is supported by the inner ring support portion 98, and is attached to the side portion 82a of the movable sheave 82. An inner diameter of the inner ring support portion 98 is larger than a coil outer diameter of the coil spring 83.

Further, an outer ring 97b of the roller bearing 97 is covered with an annular cover 99 rotatable with the outer ring 97b. Referring also to FIGS. 5 to 7, the cover 99 has an anti-rotation bar 99b that is extended toward the swing arm 91 from a side surface 99a at an opposite side from the movable sheave 82. The anti-rotation bar 99b is fitted in between the pair of swing intermediate portions 94 and 94. Consequently, rotation of the cover 99 is regulated by the swing arm 91.

Either one of the side surface 99a of the cover 99, and the side surfaces 94a and 94a of the pair of the swing intermediate portions 94 and 94, which face each other, has or have a pair of protruded portions 101 and 101 that protrude toward the other one. The pair of protruded portions 101 and 101 are formed integrally on the side surface 99a of the cover 99, for example. The pair of protruded portions 101 and 101 are located to be able to press a side surface of the outer ring 97b of the roller bearing 97 via the cover 99 when the pair of swing intermediate portions 94 and 94 displace to the cover 99 side.

Consequently, the pair of swing intermediate portions 94 and 94 indirectly contact the movable sheave 82 which is rotating via the roller bearing 97. Contact resistance of the pair of swing intermediate portions 94 and 94 to the movable sheave 82 which is rotating can be reduced. Moreover, when the pair of swing intermediate portions 94 and 94 are displaced, the protruded portions 101 and 101 press the side surface of the outer ring 97b of the roller bearing 97 via the cover 99. As compared with a case where the pair of displaced swing intermediate portions 94 and 94 press the side surface of the outer ring 97b of the roller bearing 97 via the cover 99, the contact resistance of the pair of swing intermediate portions 94 and 94 to the movable sheave 82 which is rotating can be reduced more.

As shown in FIGS. 5 to 7, the speed reduction ratio regulation mechanism 90 has a swing angle detection sensor 103 that detects a swing angle α (refer to FIG. 5) of the swing arm 91. The swing angle detection sensor 103 is configured by a rotation type potentiometer, and is attached to the track frame 11. A rotating shaft 103a of the swing angle detection sensor 103 is parallel to a support shaft 96 that supports the swing base end portion 92 of the swing arm 91. The swing angle detection sensor 103 is connected to the swing distal end portion 93 in the swing arm 91 or a vicinity of the swing distal end portion 93 by a link mechanism 104. Consequently, the swing angle α of the swing arm 91 can be detected by the swing angle detection sensor 103 via the link mechanism 104.

The link mechanism 104 has a configuration of a V-shaped link seen from an axial direction of the rotating shaft 103*a* of the swing angle detection sensor 103, and is composed of a first link pin 105, a second link pin 106, a first link bar 107 and a second link bar 108. The first and second link pins 105 and 106 are parallel to the rotating shaft 103*a* of the swing angle detection sensor 103.

The first link pin 105 is attached to the swing distal end portion 93 or the vicinity of the swing distal end portion 93. In one end portion of the second link bar 108, a slim long hole 108*a* is formed in a longitudinal direction of the second link bar 108. The first link bar 107 has one end portion attached to the first link pin 105 to be able to swing, and the other end portion connected to the long hole 108*a* of the second link bar 108 via the second link pin 106 to be relatively rotatable. The other end portion of the second link bar 108 is attached to the rotating shaft 103*a* of the swing angle detection sensor 103 with relative rotation being regulated.

A swing displacement amount of the swing distal end portion 93 in the swing arm 91 is larger than swing displacement amounts of the other parts 92 and 94. One end portion (the first link pin 105) of the link mechanism 104 is connected to the swing distal end portion 93 having a large swing displacement amount or the vicinity of the swing distal end portion 93. Consequently, the swing angle α of the swing arm 91 can be accurately detected by the swing angle detection sensor 103. Furthermore, the link mechanism 104 is provided in the swing distal end portion 93 which is far from the swing base end portion 92 or the vicinity of the swing distal end portion 93, and therefore, a degree of freedom of disposition of the swing angle detection sensor 103 can be enhanced.

As shown in FIGS. 5 to 7, the aforementioned regulation drive section 110 drives the swing distal end portion 93 of the swing arm 91 to swing continuously, and is attached to the track frame 11 by a bracket 111. The regulation drive section 110 includes an electric motor 112, a worm gear mechanism 113 and a drive force output section 114. The worm gear mechanism 113 is composed of a worm 115 that is driven by the electric motor 112, and a worm wheel 116 that is meshed with the worm 115. The worm wheel 116 is attached to a first transmission shaft 117. The drive force output section 114 is driven by the worm wheel 116.

Consequently, the worm gear mechanism 113 can be given a reverse prevention function (self lock) so that the electric motor 112 is not reversed from the swing arm 91 side. Accordingly, the swing arm 91 can be reliably regulated so as not to displace by a reaction force in the axial direction of the movable sheave 82.

The drive force output section 114 includes a pinion 121 at an input side and a gear 122 at an output side. The pinion 121 is attached to the first transmission shaft 117. The gear 122 is attached to a second transmission shaft 123. The swing distal end portion 93 of the swing arm 91 is connected to the drive force output section 114 by a connecting rod 124. Consequently, the regulation drive section 110 can be disposed in a vacant space in the belt-type continuously variable transmission 63, and therefore, a degree of freedom of disposition can be more enhanced.

In detail, one end portion 124*a* of the connecting rod 124 is connected to the swing distal end portion 93 by a ball joint 125. The other end portion 124*b* of the connecting rod 124 is connected to the gear 122 by a ball joint 126. A connection position of the other end portion 124*b* of the connecting rod 124 to the gear 122 is offset radially outward from the second transmission shaft 123.

Figure 9:
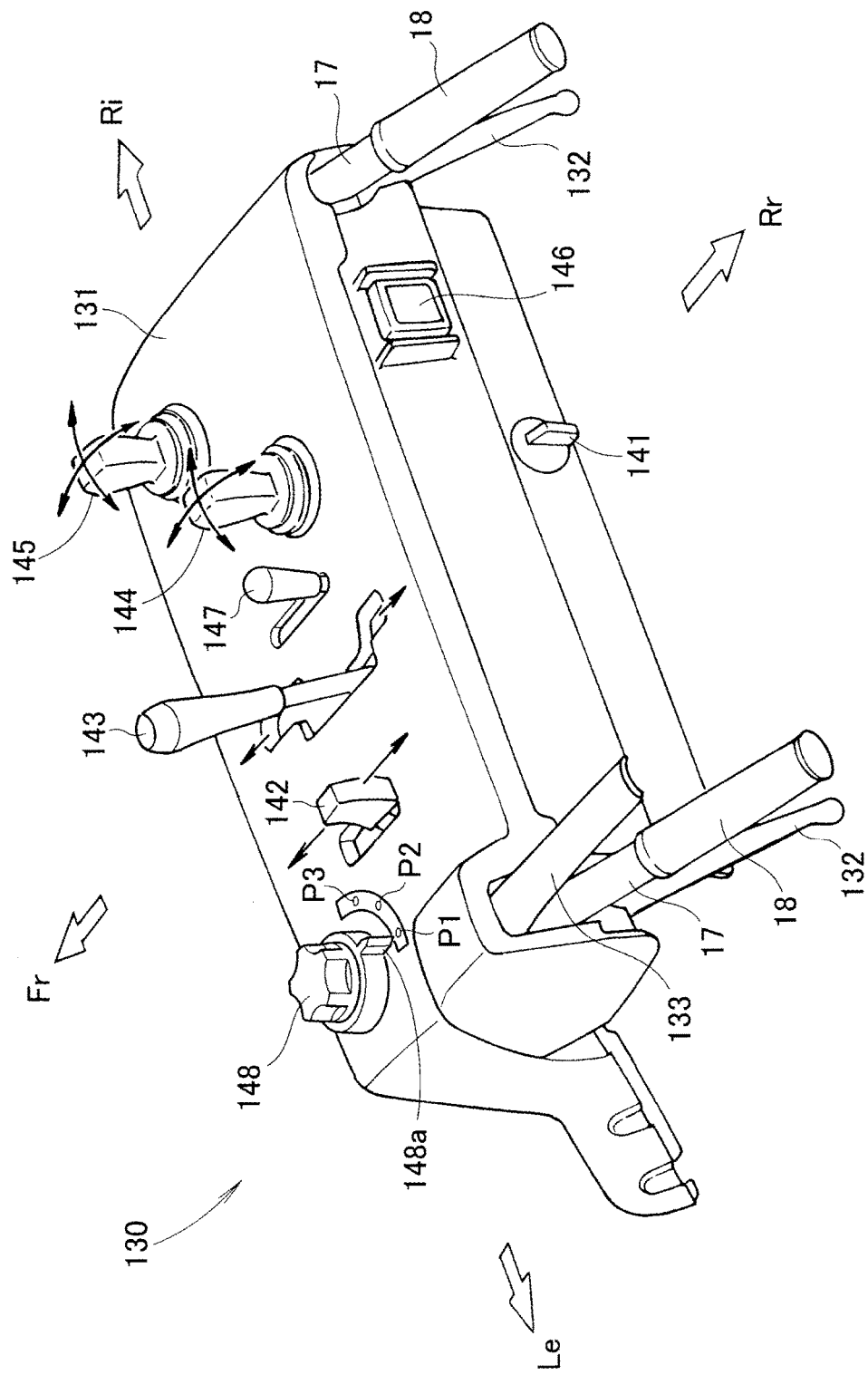
FIG. 9 is a perspective view of an operation unit shown in FIG. 1, seen from an upper rear side.

As shown in FIGS. 1 and 9, the battery 33, the control unit 43 and an operation unit 130 are disposed between the left and right operation handles 17. The operation unit 130 is composed of an operation box 131 that is provided between the left and right operation handles 17 and 17, a left and right turning operation levers 132 and 132 that are located in vicinities of the left and right grips 18 and 18 and are attached to the left and right operation handles 17 and 17, and a travel preparation lever 133 which is located in a vicinity of the left grip 18 and is attached to the left operation handle 17.

The control unit 43 permits drive of the traveling devices 12 and the working unit 14 only under a condition that a worker grips the travel preparation lever 133 and lowers the travel preparation lever 133 to the grip 18 side. Further, when the worker grips the left one or the right one of the turning operation levers 132 and 132, the control unit 43 controls the left and right traveling devices 12 and 12 to turn the working machine 10 to a direction of the turning operation lever which is gripped.

As shown in FIGS. 2 and 9, the operation box 131 includes a main switch 141, a throttle lever 142, a direction speed lever 143, an auger housing posture operation lever 144, a chute operation lever 145, an auger switch 146, a target working speed setting section 147, and a mode changeover switch 148.

The main switch 141 is a manual switch that turns on an electric system and can start the engine 13, and is configured by a rotary switch (including a key switch), for example.

The throttle lever 142 is an operation member for controlling a rotational speed of the engine 13. That is, the throttle lever 142 is an operation member for controlling an opening degree of the throttle valve 45 by controlling the control motor 44 of the electronic governor 42, can be reciprocated in a fore-and-aft direction as arrows by a hand of the worker, and issues a voltage signal corresponding to a position by a potentiometer (not illustrated). The control unit 43 controls the opening degree of the throttle valve 45 by performing drive control of the control motor 44 in accordance with a signal of an operation amount of the throttle lever 142 and an opening degree signal of the opening degree sensor 46. If the throttle lever 142 is pushed down rearward, the throttle valve 45 can be closed to full closure. If the throttle lever 142 is pushed down forward, the throttle valve 45 can be opened to full opening. As a result, the rotational speed Er of the engine 13 can be adjusted.

In this manner, the throttle lever 142 is a drive minimum speed setting section that can optionally set a target minimum rotational speed (an idling speed of the engine 13 or a value of a slightly higher than this, for example) which is a target of the engine 13 (the drive source 13). Further, the throttle lever 142 is also a drive source operation member capable of manually operating the rotational speed Er of the engine 13. Hereinafter, the throttle lever 142 will be properly reworded as "the drive minimum speed setting section 142" or "the drive source operation member 142".

The direction speed lever 143 is an operation member for controlling rotation of the left and right electric motors 21 (refer to FIG. 1), and can be operated to reciprocate to a front and a rear as arrows from an upright neutral position by the hand of a worker. If the direction speed lever 143 is pushed down to a forward moving side (forward) from the neutral position, the working machine 10 shown in FIG. 1 can be moved forward, and speed control can be also performed so that as the direction speed lever 143 is pushed down to the forward moving side more, the working machine 10 is moved forward at a higher speed. Similarly, if the direction speed lever 143 is pushed down to a reverse side (rearward) from the neutral position, the working machine 10 can be also reversed, and speed control can be also performed in such a manner that the direction speed lever 143 is pushed down to the reverse side more, the working machine 10 can be reversed at a higher speed.

The auger housing posture operation lever 144 is an operation member for changing a posture of the auger housing 51, and can be operated to reciprocate to a front and a back, and a left and a right as arrows from a neutral position by the hand of the worker.

The chute operation lever 145 is an operation member for changing orientations of the chute 55 and the chute guide 57, and can be operated to reciprocate to the front and the rear, and to the left and the right as arrows from a neutral position by the hand of the worker. The control unit 43 adjusts the respective orientations of the chute 55 and the chute guide 57 by performing drive control of the chute drive motor 56 and a guide drive motor 58, in accordance with respective signals of an operation direction and an operation amount of the chute operation lever 145.

The auger switch 146 (also referred to as "the clutch operation switch 146") is a manual switch for switching on and off the electromagnetic clutch 61, and is composed of a push button switch, for example. When the auger switch 146 is on, the electromagnetic clutch 61 is on. When the auger switch 146 is off, the electromagnetic clutch 61 is off.

That is, the travel preparation lever 133 is gripped, and the auger switch 146 is operated to be on, whereby the control unit 43 connects (on) the electromagnetic clutch 61, and can rotate the auger 53 and the blower 54 by the power of the engine 13. The travel preparation lever 133 is made free, or the auger switch 146 is operated to be off, whereby the electromagnetic clutch 61 can be brought into a disconnected (off) state.

The target working speed setting section 147 is an operation member for optionally setting a target working rotational speed of the working unit 14, and is configured by an operation lever. The target working speed setting section 147 can be reciprocated in a fore-and-aft direction as arrows, by the hand of the worker, and issues a voltage signal corresponding to a position, that is, a signal of the target working rotational speed by a potentiometer (not illustrated).

As described above, the target working rotational speed of the working unit 14 is set by the target working speed setting section 147. A snow throwing distance from the chute 55 is determined in accordance with a rotational speed of the blower 54, in the working unit 14. The snow throwing distance from the chute 55 can be adjusted by setting the target working rotational speed of the working unit 14, that is, a target working rotational speed of the rotating shaft 62 and the blower 54 by the target working speed setting section 147. Hereinafter, the target working speed setting section 147 will be properly reworded as "the snow throwing distance lever 147".

The control unit 43 controls the engine 13 (the drive source 13) and the speed reduction ratio regulation mechanism 90. The control unit 43 is configured to control the rotational speed Er of the engine 13 so as to bring the actual working rotation speed Br (the actual working rotational speed Br of the blower 54, in particular) of the working unit 14, which is detected by the working unit speed sensor 76 close to the target working rotational speed set by the target working speed setting section 147.

Further, the control unit 43 is configured to obtain a minimum limit speed reduction ratio on the basis of a target minimum rotational speed of the engine 13 which is set in advance or is optionally set by the throttle lever 142 (the drive minimum speed setting section 142), and the target working rotational speed of the working unit 14 which is set by the target working speed setting section 147, and control the speed reduction ratio regulation mechanism 90 so as to keep the obtained minimum limit speed reduction ratio. More specifically, the control unit 43 controls the regulation drive section 110 in the speed reduction ratio regulation mechanism 90, that is, the electric motor 112.

The mode changeover switch 148 is a manual changeover switch that switches a travel control mode in the control unit 43, and is composed of a rotary switch, for example. By turning a knob 148a of the mode changeover switch 148 counterclockwise in the drawing, switch can be made to a first control position P1, a second control position P2 and a third control position P3. When switch is made to the respective positions P1, P2 and P3, the mode changeover switch 148 issues respective corresponding switch signals. Arrangement of the respective positions P1, P2 and P3 is optional.

The first control position P1 is a switch position for causing the control unit 43 to perform control in "a first control mode". The second control position P2 is a switch position for causing the control unit 43 to perform control in "a second control mode". The third control position P3 is a switch position for causing the control unit 43 to perform control in "a third control mode".

The control unit 43 is configured to control the engine 13, the working unit 14 and the speed reduction ratio regulation mechanism 90 on the basis of a plurality of control modes which are set in advance to be switchable by the mode changeover switch 148. The aforementioned plurality of control modes include the first control mode, the second control mode and the third control mode.

The first control mode is an auto mode that controls the engine 13 (the drive source 13), the working unit 14 and the speed reduction ratio regulation mechanism 90 by setting of the target working speed setting section 147 as described above. That is, the first control mode is an auto mode which (1) controls the rotational speed Er of the engine 13 so as to bring the actual working rotational speed Br of the working unit 14, which is detected by the working unit speed sensor 76 close to the target working rotational speed which is set by the target working speed setting section 147, and (2) obtains the minimum limit speed reduction ratio on the basis of "the target minimum rotational speed of the engine 13" which is set in advance or is optionally set by the throttle lever 142 (the drive minimum speed setting section 142), and "the target working rotational speed" of the working unit 14 which is set by the target working speed setting section 147, and controls the speed reduction ratio regulation mechanism 90 to keep the obtained minimum limit speed reduction ratio.

The worker who desires to perform work quickly and efficiently, and an intermediate-level worker who is used to work to some extent can select the first control mode.

The second control mode is a mode that controls the rotational speed Er of the engine 13, in accordance with an operation amount of the throttle lever 142 (the drive source operation member 142) for manually operating the rotational speed Er of the engine 13. In the second control mode, the set signal of the target working speed setting section 147 is ignored. That is, the second control mode is a manual mode that performs control by a manual operation on the basis of the rotational speed Er of the engine 13. The second control mode performs only load control by the rotational speed Er of the engine 13, and can be used when the worker can know the start of the load. Since there is less intervention by the control unit 43, the intention of a worker can be sufficiently reflected. An upper-level worker who is used to work can select the second control mode.

The third control mode is a mode that performs control to decrease the traveling speed of the traveling devices 12 (refer to FIG. 1) to a great degree with respect to an increase amount of the opening degree of the throttle valve 45. A beginner who is not used to work can select the third control mode.

In this way, the control unit 43 controls the traveling devices 12, the drive source 13, the working unit 14 and the speed reduction ratio regulation mechanism 90 on the basis of the respective control modes which are switched by the mode changeover switch 148. Consequently, the worker can make a working content corresponding to preference by optionally selecting the plurality of control modes in accordance with a level of skill of work and a working situation.

Next, operations of the driven pulley 74 and the speed reduction ratio regulation mechanism 90 of the above described configurations will be described. FIG. 5 shows a state in which the movable sheave 82 is not regulated at all by the speed reduction ratio regulation mechanism 90. The swing arm 91 in this state inclines apart from the side surface 99a of the movable sheave 82 to a maximum extent, and stops. That is, the swing distal end portion 93 of the swing arm 91 is the most separated from the side surface 99a of the movable sheave 82. An inclination position A1 of the swing arm 91 at this time will be referred to as "the most alienated position A1". The side surfaces 94a and 94a of the pair of swing intermediate portions 94 and 94 are slightly separated from the protruded portion 101. The movable sheave 82 is at a position that is the most alienated with respect to the fixed sheave 81.

Thereafter, the electric motor 112 normally rotates, and thereby causes the connecting rod 124 to advance toward the movable sheave 82 side, via the worm gear mechanism 113 and the drive force output section 114. The connecting rod 124 which advances causes the swing arm 91 to swing toward the movable sheave 82 side. The result is shown in FIG. 8.

Figure 8:
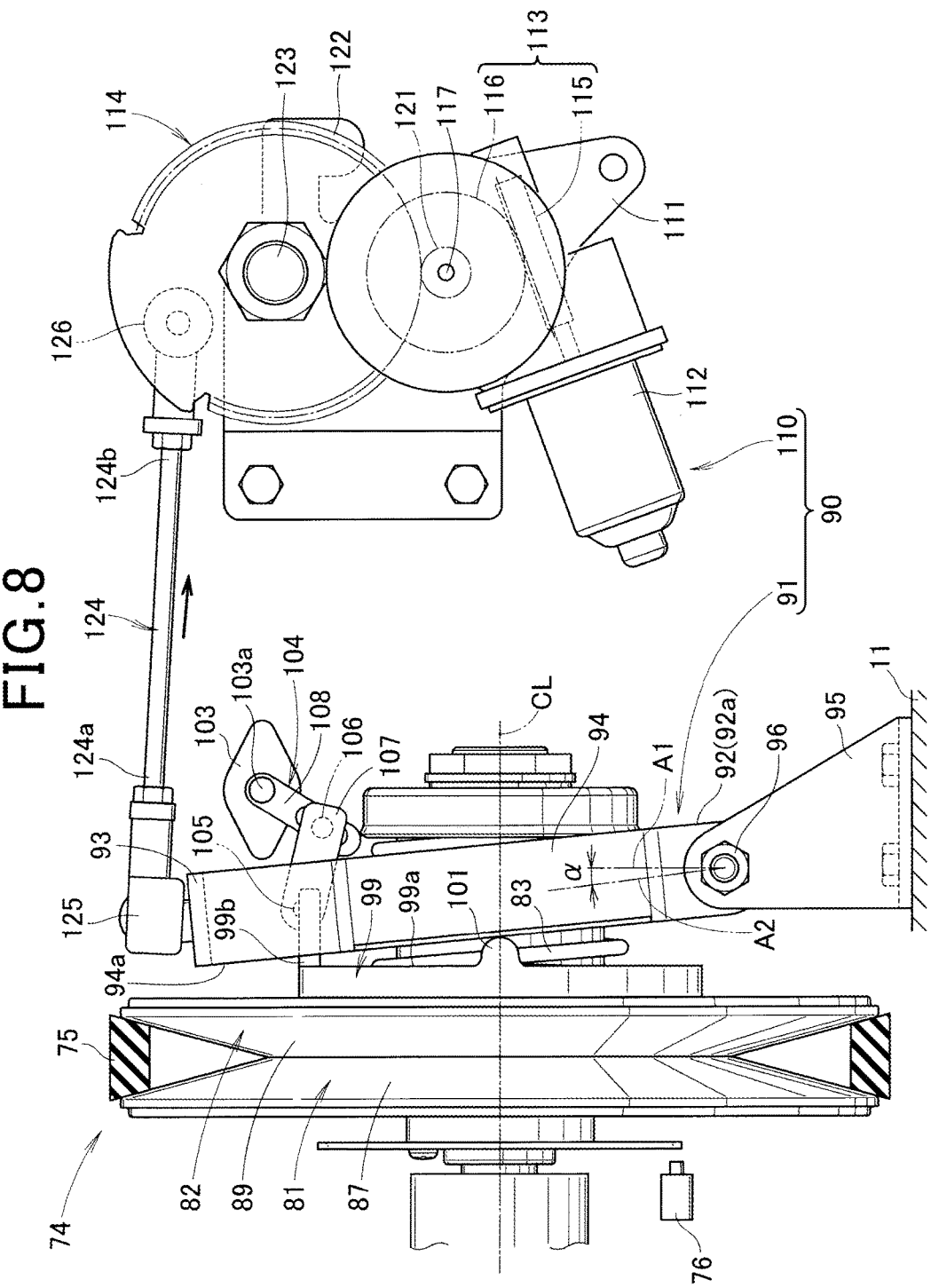
FIG. 8 is an operation diagram of a state in which a movable sheave shown in FIG. 5 is regulated to a maximum extent by the speed reduction ratio regulation mechanism.

FIG. 8 shows a state in which the movable sheave 82 is regulated to a maximum extent by the speed reduction ratio regulation mechanism 90. In this state, the electric motor 112 stops. Consequently, the pair of swing intermediate portions 94 and 94 press the protruded portion 101, and stop. The swing distal end portion 93 of the swing arm 91 is the closest to the side surface 99a of the movable sheave 82. An inclination position A2 of the swing arm 91 at this time is referred to as "a closest position A2". The swing angle α of the swing arm 91 from the most alienated position A1 to the closest position A2 becomes maximum. The movable sheave 82 is located at a position that is the closest to the fixed sheave 81, for example, a position where the sheaves 81 and 82 are in close proximity to or contact each other, for example.

Thereafter, the electric motor 112 reverses, and thereby causes the connecting rod 124 to retreat in a direction to separate from the movable sheave 82 via the worm gear mechanism 113 and the drive force output section 114. The connecting rod 124 which retreats causes the swing arm 91 to swing in a direction to separate from the movable sheave 82. The result is shown in FIG. 5.

In this manner, the movable sheave 82 is displaceable in only an allowable range (only in a low speed range) from the position which is the closest to the fixed sheave 81 (refer to FIG. 8) to the maximum alienated position (refer to FIG. 5) which is regulated by the swing arm 91. That is, by adjusting the swing displacement amount of the swing arm 91, rotation in the high speed region of the driven pulley 74 can be properly regulated. As shown in FIG. 2, "the minimum speed reduction ratio" of the rotational speed Br of the driven pulley 74 to the rotational speed Er of the drive pulley 72 can be regulated by the swing arm 91.

Rewording by also referring to FIG. 2, in only the range of the low speed region of the driven pulley 74, the movable sheave 82 displaces to approach and alienates with respect to the fixed sheave 81, in accordance with increase and decrease of the load of the working unit 14 (refer to FIG. 2). In the aforementioned low speed region, the speed reduction ratio Ra of the rotational speed Br of the driven pulley 74 to the rotational speed Er of the drive pulley 72 can be automatically changed by the operations of the coil spring 83 and the torque cam mechanism 84, in accordance with increase and decrease of the load on the working unit 14. As a result, the rotation in the high speed region of the working unit 14 can be properly regulated in accordance with the working situation of the working machine 10.

When the load on the working unit 14 abruptly decreases, the movable sheave 82 is to alienate temporarily from the fixed sheave 81, by operation of the torque cam mechanism 84. That is, the rotational speed Br of the working unit 14 is to be a high speed temporarily. In relation to this, in the present embodiment, the rotation in the high speed region of the driven pulley 74 can be regulated by the swing arm 91. Consequently, abrupt rotation in the high speed region of the driven pulley 74 can be regulated. Workability of the working machine 10 including the belt-type continuously variable transmission 63 can be enhanced more.

That is, even when the snow removal load on the working unit 14 abruptly decreases, abrupt rotation in the high speed region of the blower 54 is regulated. Consequently, the snow throwing distance from the chute 55 does not extend abruptly. When a snow throwing place where snow is thrown from the working machine 10 (the auger type snowplow 10) is narrow, and when snow removing work is performed in an area dense with housing, the worker does not have to adjust the snow throwing direction and the snow throwing angle of the chute 55 frequently, and snow removing workability is more enhanced.

Figure 11:
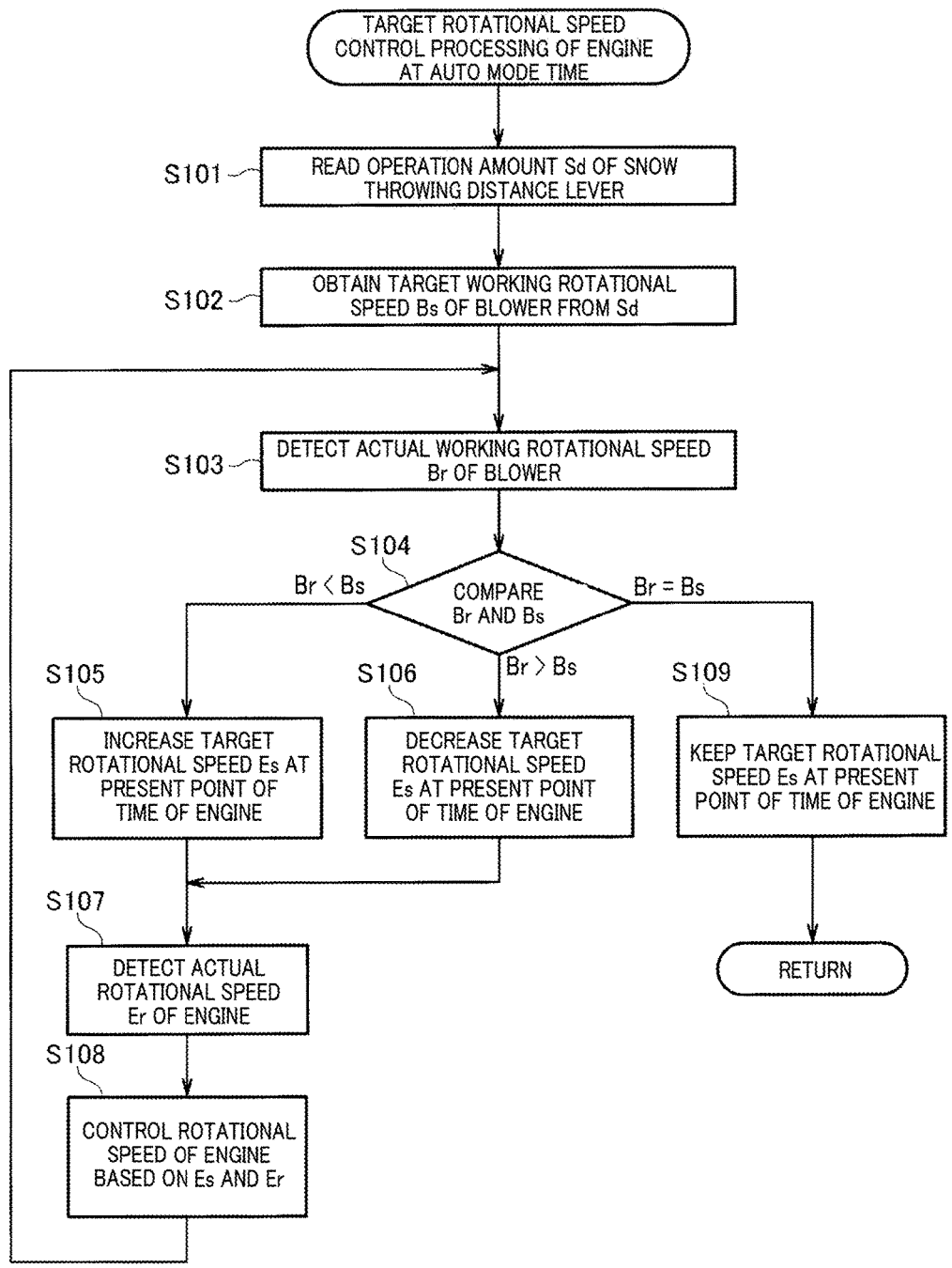
FIG. 11 is a control flowchart of a subroutine that executes target rotational speed control of a drive unit at a time of an auto mode shown in FIG. 10.
Figure 12:
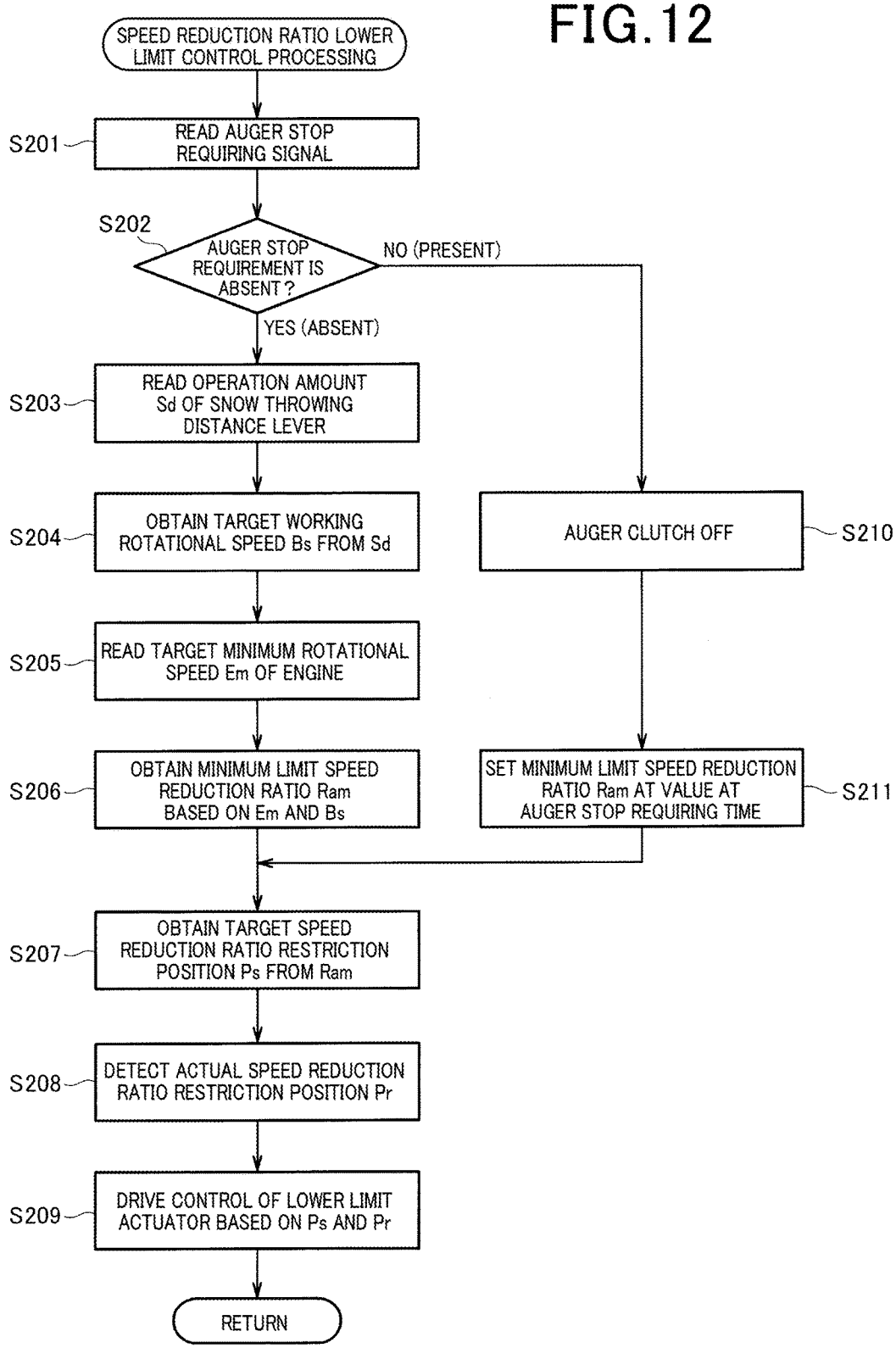
FIG. 12 is a control flowchart of a subroutine that executes speed reduction ratio lower limit control processing shown in FIG. 10.

Next, a control flow in a case of the control unit 43 (refer to FIG. 2) being configured by a microcomputer will be described on the basis of FIGS. 10 to 12. In the control flow, the control is started when the main switch 141 is turned on, for example, and control is ended when the main switch 141 is turned off. The engine 13 starts by turning on the main switch 141, and is stopped by turning off the main switch 141.

In control flowcharts shown in FIGS. 10 to 12, only steps concerning controls of the engine 13 (the drive source 13) and the speed reduction ratio regulation mechanism 90 in the control of the working machine 10 will be described, and steps concerning other controls will be omitted. Hereinafter, explanation will be made with reference to FIGS. 1 and 2.

Figure 10:
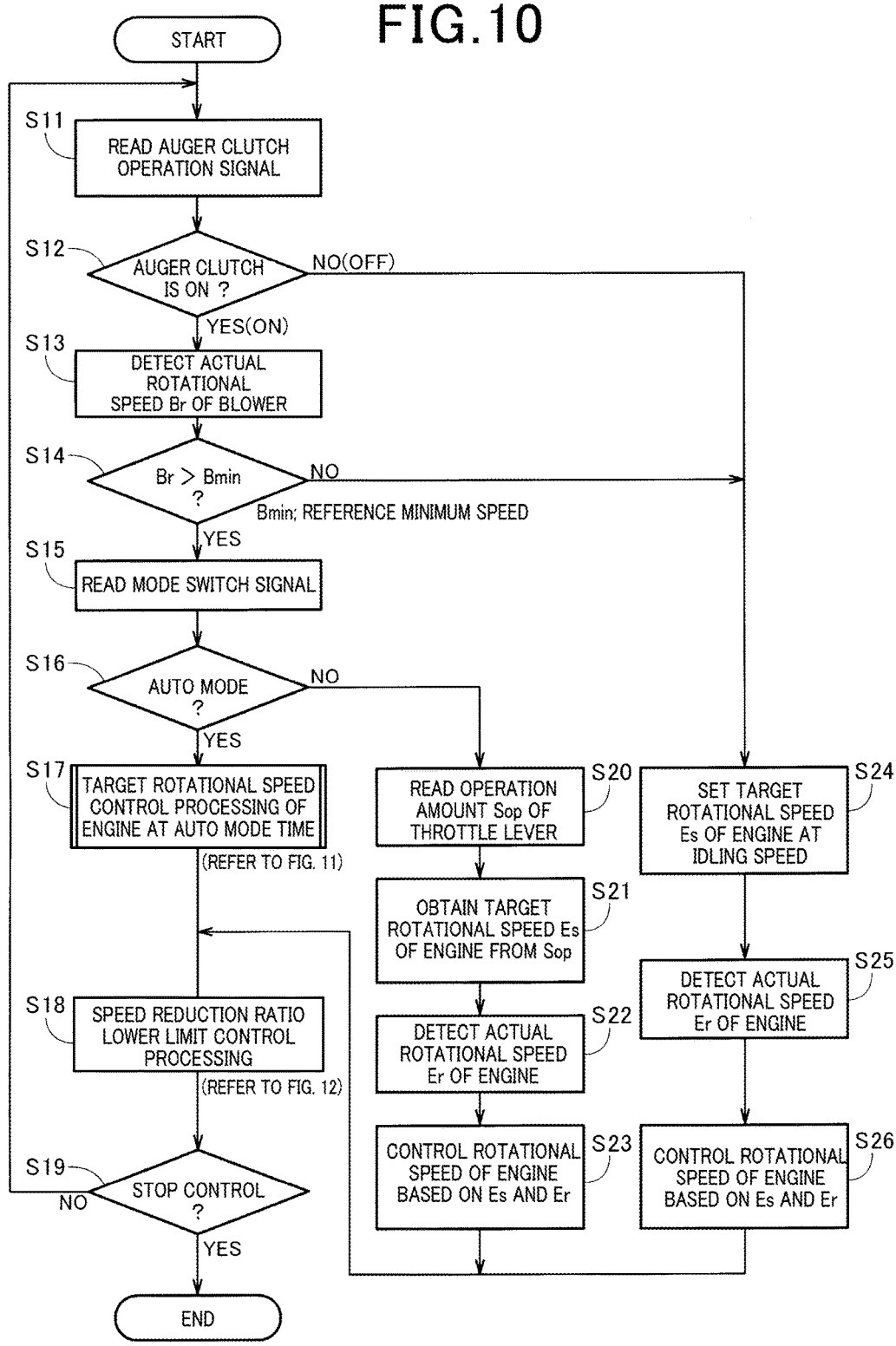
FIG. 10 is a control flowchart of a control unit shown in FIG. 2.

FIG. 10 is a control flowchart of the control unit 43 according to the present invention. When the control unit 43 starts control, the control unit 43 reads an operation signal of the auger clutch 61 first in step S11. Next, the control unit 43 determines whether or not the auger clutch 61 is connected (step S12). When the auger clutch 61 is connected (on) here, the working unit 14 is operated, and therefore, the flow proceeds to step S13.

In step S13, the actual working rotational speed Br of the blower 54 is detected. The working rotational speed Br is detected by the working unit speed sensor 76. Next, it is determined whether or not the actual working rotational speed Br of the blower 54 is higher than a reference minimum speed Bmin which is set in advance (step S14). The reference minimum speed Bmin is set at the rotational speed at the time of the working unit 14 being in a no-load state. Here, when the actual working rotational speed Br is higher than the reference minimum speed Bmin (Br>Bmin), the flow proceeds to step S15.

In step S15, the switch signal of the mode changeover switch 148 is read. Next, it is determined whether or not the control mode is an auto mode on the basis of the switch signal of the mode changeover switch 148 (step S16). When the knob 148a of the mode changeover switch 148 shown in FIG. 9 is in the first control position P1, the control mode is the auto mode (the first control mode), and the flow proceeds to step S17.

In step S17, target rotational speed control processing of the engine 13 at a time of the auto mode is executed. A specific control flow for executing the target rotational speed control processing of the engine 13 at the time of the auto mode in step S17 will be described in accordance with FIG. 11. Next, in step S18, speed reduction ratio lower limit control processing is executed. A specific control flow for executing the speed reduction ratio lower limit control processing in step S18 will be described in accordance with FIG. 12.

Next, the control unit 43 determines whether or not to stop the control flow (step S19). Here, when the main switch 141 is on, the control unit 43 determines to continue control and returns to step S11. When the main switch 141 is off, the control unit 43 determines to stop control, and ends a series of controls.

Meanwhile, when it is determined that the control mode is not the auto mode (the first control mode) in step S16 described above, the flow proceeds to step S20. When the knob 148a of the mode changeover switch 148 shown in FIG. 9 is in the second control position P2 or the third control position P3, the control mode is not the auto mode.

In step S20, an operation amount Sop of the throttle lever 142 is read. More specifically, the potentiometer (not illustrated) which is interlocked with the throttle lever 142 issues a voltage signal corresponding to a position of the throttle lever 142, that is, the operation amount Sop. By reading the voltage signal, the operation amount Sop can be obtained.

Next, a target rotational speed Es of the engine 13 is obtained from the operation amount Sop (step S21). A value of the target rotational speed Es can be obtained from a map or an arithmetic operation, for example. The map has a characteristic of a correlation of the operation amount Sop and the target rotational speed Es, that is, a characteristic which is practically a proportional relation.

Next, the actual rotational speed Er of the engine 13 is detected (step S22). The rotational speed Er is detected by the engine speed sensor 41. Next, the engine rotational speed control is executed so that the actual rotational speed Er corresponds to the target rotational speed Es (step S23), and thereafter, the flow proceeds to step S18. In step S23, the opening degree of the throttle valve 45 is controlled by performing drive control of the control motor 44.

When the auger clutch 61 is disconnected (off) in step S12 described above, the engine 13 is in a no load state by the working unit 14 stopping, and therefore, the flow proceeds to step S24. Further, when the actual working rotational speed Br is the reference minimum speed Bmin or less in step S14 described above (Br≤Bmin), the working unit 14 is in a non load state, and therefore, the flow proceeds to step S24. In step S24, the target rotational speed Es of the engine 13 is set at an idling speed (the minimum rotational speed in the no load state).

Next, the actual rotational speed Er of the engine 13 is detected (step S25). The rotational speed Er is detected by the engine speed sensor 41. Next, the engine rotational speed control is executed so that the actual rotational speed Er corresponds to the target rotational speed Es (step S26), and thereafter, the flow proceeds to step S18. In step S26, the opening degree of the throttle valve 45 is controlled by performing drive control of the control motor 44, for example.

Next, a specific control flow for executing the target rotational speed control processing of the engine 13 at the time of the auto mode in step S17 shown in FIG. 10 described above will be described. FIG. 11 is a subroutine for the control unit 43 to execute "the target rotational speed control of the engine 13 at the time of the auto mode" in step S17 shown in FIG. 10 described above.

The control unit 43 firstly reads an operation amount Sd of the snow throwing distance lever 147 (the target working speed setting section 147) in step S101. More specifically, a voltage signal corresponding to the position of the snow throwing distance lever 147, that is, the operation amount Sd is issued. By reading the voltage signal, the operation amount Sd can be obtained.

In next step S102, a target working rotational speed Bs of the working unit 14, that is, the target working rotational speed Bs of the rotating shaft 62 and the blower 54 is obtained from the operation amount Sd of the snow throwing distance lever 147. A value of the target working rotational speed Bs can be obtained from a map or an arithmetic operation, for example. The map has a characteristic of a correlation of the operation amount Sd and the target working rotational speed Bs, that is, a characteristic which is practically a proportional relation.

Next, the actual working rotational speed Br of the working unit 14, that is, the blower 54 is detected (step S103). The working rotational speed Br is detected by the working unit speed sensor 76. Next, the actual working rotational speed Br and the target working rotational speed Bs are compared (step S104).

Here, when it is determined that the actual working rotational speed Br is lower than the target working rotational speed Bs (Br<Bs), the speed of the engine 13 is increased in order to increase the actual working rotational speed Br, and the flow proceeds to step S105. In step S105, the target rotational speed Es at the present point of time of the engine 13 is increased by a predetermined very small constant speed ΔEs (Es=Es+ΔEs), and thereafter, the flow proceeds to step S106.

Meanwhile, when it is determined that the actual working rotational speed Br of the blower 54 is higher than the target working rotational speed Bs (Br>Bs) in step S104 described above, the engine 13 needs to decelerated in order to decrease the actual working rotational speed Br, and the flow proceeds to step S106. In step S106, the target rotational speed Es at the present point of time of the engine 13 is decreased by the predetermined very small constant speed ΔEs (Es=Es−ΔEs), and thereafter the flow proceeds to step S107.

In step S107, the actual rotational speed Er of the engine 13 is detected. The rotational speed Er is detected by the engine speed sensor 41. Next, in step S108, the rotational speed of the engine 13 is controlled on the basis of a difference of the actual rotational speed Er with respect to the target rotational speed Es at the present point of time, and thereafter the flow returns to step S103.

When it is determined that the actual working rotational speed Br of the blower 54 is the same speed as the target working rotational speed Bs in step S104 described above (Br=Bs), the target rotational speed Es at the present point of time of the engine 13 is kept as it is (step S109). Thereafter, the subroutine of the target rotational speed control of the engine 13 at the time of the auto mode is ended.

In this way, so-called feedback control which repeats steps S103 to S108 is executed, until the actual working rotational speed Br of the blower 54 corresponds to the target working rotational speed Bs.

Next, a specific control flow for executing the speed reduction ratio lower limit control processing in step S18 shown in FIG. 10 described above will be described. FIG. 12 is a subroutine for the control unit 43 to execute "the speed reduction ratio lower limit control processing" of step S18 shown in FIG. 10 described above.

The control unit 43 firstly reads a signal requiring stop of the auger 53 (a signal requiring stop of the working unit 14) in step S201. Here, the signal requiring stop of the working unit 14 refers to a switch signal of the travel preparation lever 133 and the signal of the auger switch 146. The auger clutch 61 is connected (on), when the switch of the travel preparation lever 133 is on, and the auger switch 146 is on, and is disconnected (off) when either one of them is off. That is, an on-operation of the auger clutch 61 is permitted, only when the worker grips the travel preparation lever 133. When the auger switch 146 is operated to be on in the permission state, the auger clutch 61 is operated to be connected.

In next step S202, it is determined whether or not the signal requiring stop of the auger 53 (the signal requiring stop of the working unit 14) is absent. Here, when the switch of the travel preparation lever 133 is on, and the auger switch 146 is on, the signal requiring stop is absent, and the operation of the working unit 14 is continued, so that the flow proceeds to next step S203.

In step S203, the operation amount Sd of the snow throwing distance lever 147 is read. More specifically, a voltage signal corresponding to the position of the snow throwing distance lever 147, that is, the operation amount Sd is issued. By reading the voltage signal, the operation amount Sd can be obtained.

In next step S204, the target working rotational speed Bs of the working unit 14, that is, the target working rotational speed Bs of the rotating shaft 62 and the blower 54 is obtained from the operation amount Sd of the snow throwing distance lever 147. The value of the target working rotational speed Bs can be obtained from a map or an arithmetic operation, for example. The map has a characteristic of a correlation of the operation amount Sd and the target working rotational speed Bs, that is, a characteristic that is practically a proportional relation.

In next step S205, the target minimum rotational speed Em of the engine 13 is read from the memory 43a. The target minimum rotational speed Em of the engine 13 is practically a minimum speed at which the engine 13 can operate stably. The value of the target minimum rotational speed Em is stored in the memory 43a as the following two storage examples.

(1) A first storage example is an example in which a predetermined value of "the target minimum rotational speed Em of the engine 13" which is set in advance is stored in the memory 43a in advance. Describing in detail, the first storage example is the example in which the predetermined value of "the target minimum rotational speed Em" is stored in the memory 43a before the working machine 10 is shipped from a manufacturing plant, or before the worker starts the engine 13.

(2) A second storage example is an example in which "the target minimum rotational speed Em of the engine 13" which is optionally set by the throttle lever 142 (the drive minimum speed setting section 142) is stored in the memory 43a. Describing in detail, the position of the throttle lever 142 (the drive minimum speed setting section 142), that is, the operation amount Sop at the time of starting the engine 13 is detected by the potentiometer which is interlocked with the throttle lever 142, as in step S20 in FIG. 10 described above. The target rotational speed Es of the engine 13 is obtained from the operation amount Sop as in step S21 in FIG. 10 described above. The target rotational speed Es at the time of starting the engine 13 is stored in the memory 43a as the "target minimum rotational speed Em" (Es→Em).

In next step S206, a minimum limit speed reduction ratio Ram is obtained on the basis of the target minimum rotational speed Em of the engine 13 and the target working rotational speed Bs of the working unit 14. Here, the minimum limit speed reduction ratio Ram refers to a minimum limit value that is regulated by the swing arm 91, in the speed reduction ratio Ra of the driven pulley 74 to the drive pulley 72. The value of the minimum limit speed reduction ratio Ram can be obtained by an arithmetic operation or a map shown in FIG. 13, for example.

Figure 13:
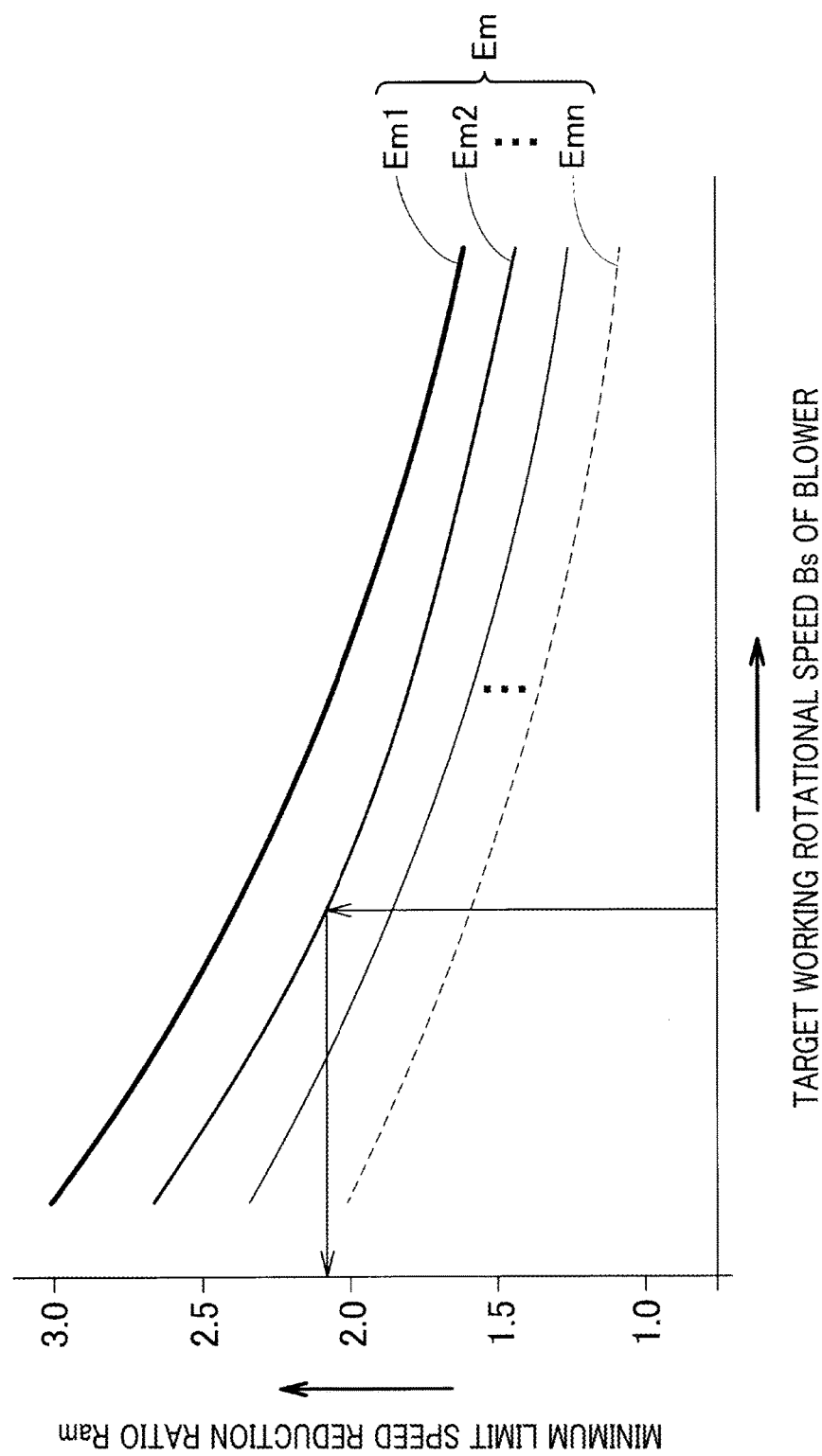
FIG. 13 is a map for obtaining a minimum limit speed reduction ratio in step S206 shown in FIG. 12.

FIG. 13 is the map for obtaining the minimum limit speed reduction ratio Ram, and has a characteristic of a correlation of the target working rotational speed Bs and the minimum limit speed reduction ratio Ram, for each of the respective target minimum rotational speeds Em of the engine 13, with the target working rotational speed Bs of the blower 54 (the working unit 14) plotted in the horizontal axis, and the minimum limit speed reduction ratio Ram plotted in the vertical axis.

In FIG. 13, a plurality of downward-sloping curves Em1, Em2, . . . Emn express characteristics at times of the respective target minimum rotational speeds Em of the engine 13. The curve Em1 is a characteristic curve in a case where the target minimum rotational speed Em is a high speed. The plurality of curves Em1, Em2, . . . Emn are characteristic curves in a case where as the curve shifts from the curve Em1 downward to the curves Em2, . . . Emn, the target minimum rotational speed Em becomes a lower speed.

As is obvious from FIG. 13, a characteristic of the minimum limit speed reduction ratio Ram is a characteristic that decreases as the target minimum rotational speed Em of the engine 13 (the drive source 13) becomes smaller, and increases as the target working rotational speed Bs of the working unit 14 becomes smaller.

During a normal operation of the working machine 10, the target minimum rotational speed Em of the engine 13 is kept constant. The minimum limit speed reduction ratio Ram is subjected to limitation of the target minimum rotational speed Em. When the target working rotational speed Em is constant, the minimum limit speed reduction ratio Ram is restricted from decreasing. However, even when the target minimum rotational speed Em is constant, if the target working rotational speed Bs of the working unit 14 is changed, the minimum limit speed reduction ratio Ram changes in accordance with a change amount of the target working rotational speed Bs.

Returning to FIG. 12, explanation will be continued. In step S207, a target speed reduction ratio restriction position Ps (the target separation position Ps) of the movable sheave 82 to the fixed sheave 81 is obtained from the minimum limit speed reduction ratio Ram. The value of the target speed reduction ratio restriction position Ps can be obtained by a map or an arithmetic operation, for example. The map has a characteristic of a correlation of the minimum limit speed reduction ratio Ram and the target speed reduction ratio restriction position Ps, that is, a characteristic that is practically a proportional relation. The target speed reduction ratio restriction position Ps corresponds to a target value αs of a swing angle, that is, a target swing angle αS, in which the swing distal end portion 93 of the swing arm 91 shown in FIG. 5 goes from "the most alienated position A1" to "the closest position A2".

In next step S208, an actual speed reduction ratio restriction position Pr (an actual separation position Pr) of the movable sheave 82 with respect to the fixed sheave 81 is detected. The actual speed reduction ratio restriction position Pr corresponds to an actual swing angle αr in which the swing distal end portion 93 of the swing arm 91 shown in FIG. 5 goes to "the closest position A2" from "the most alienated position A1". The actual swing angle αr is detected by the swing angle detection sensor 103.

Next, drive control of the regulation drive section 110 is executed so that the actual speed reduction ratio restriction position Pr corresponds to the target speed reduction ratio restriction position Ps, that is, so that the actual swing angle αr corresponds to the target swing angle αs (step S209). Thereafter, the subroutine of the speed reduction ratio lower limit control processing is ended. In step S209, drive control of the regulation drive section 110 is performed, whereby a swing amount of the swing arm 91 is controlled. In this manner, the speed reduction ratio regulation mechanism 90 can be controlled to keep the minimum limit speed reduction ratio Ram.

Meanwhile, when either one or both of the switch of the travel preparation lever 133 and the auger switch 146 is or are off in step S202 described above, that is, when the signal which requires stop is present, the flow proceeds to next step S210. In step S210, the auger clutch 61 is disconnected (off). As a result, the working unit 14 stops.

In next step S211, the value of the minimum limit speed reduction ratio Ram is set at a speed reduction ratio at a time of a signal that requires stop of the auger 53 (a signal requiring stop of the working unit 14) being present, for example, the speed reduction ratio is set as maximum, and thereafter the flow proceeds to step S207.

Summary of the above explanation is as follows. As shown in FIG. 2, the worker can optionally set the target working rotational speed Bs of the working unit 14 by operating the target working speed setting section 147. The control unit 43 brings the actual working rotational speed Br of the working unit 14 close to the target working rotational speed Bs by controlling the rotational speed Er of the engine 13. Accordingly, the working rotational speed Br of the working unit 14 can be optionally and easily adjusted, and an optimal working situation can be made.

Further, the control unit 43 controls the speed reduction ratio regulation mechanism 90 so as to keep the minimum limit speed reduction ratio Ram which is obtained on the basis of both the target minimum rotational speed Em of the engine 13 and the target working rotational speed Bs of the working unit 14. Consequently, the minimum limit speed reduction ratio Ram of the driven pulley 74 to the drive pulley 72 can be regulated (set) by the speed reduction ratio regulation mechanism 90.

The target minimum rotational speed Em of the engine 13 is practically set at the minimum speed at which the engine 13 can operate stably. The value of the target minimum rotational speed Em is kept constant as long as the value is not changed. When the target minimum rotational speed Em is constant, the minimum limit speed reduction ratio Ram is kept. Further, when the target working rotational speed Bs is constant, decrease of the minimum limit speed reduction ratio Ram is restricted. Even when the target minimum rotational speed Em of the engine 13 is constant, if the target working rotational speed Bs is changed, the minimum limit speed reduction ratio Ram changes in accordance with the change amount of the target working rotational speed Bs.

In this manner, the minimum limit speed reduction ratio Ram is regulated not to be excessively reduced. In accordance with abrupt increase of the load on the working unit 14, the rotational speed Er of the engine 13 can be temporarily reduced. Even if the rotational speed Er of the engine 13 is abruptly reduced to the target minimum rotational speed Em, the load which acts on the driven shaft 73 at which the fixed sheave 81 is provided can be prevented from exceeding the drive force which is transmitted to the movable sheave 82 from the engine 13. Accordingly, slide displacement of the movable sheave 82 by the torque cam mechanism 84 can be smoothly performed.

As above, the actual working rotational speed Br of the working unit 14 is controlled to be close to (including corresponding to) the optional target working rotational speed Em which is adjusted by the worker. The speed reduction ratio Ra can automatically displace in accordance with a load from the minimum limit speed reduction ratio Ram to the maximum speed reduction ratio which is allowed by the torque cam mechanism 84. Accordingly, it is possible to respond to the load on the working unit 14 abruptly varying, and stable work by the working unit 14 can be performed. In addition, the target working speed setting section 147 only has to be operated, and therefore, the working rotational speed Br of the working unit 14 can be easily operated.

Furthermore, as shown in FIG. 13, the characteristic of the minimum limit speed reduction ratio Ram is the characteristic that decreases as the target minimum rotational speed Em of the engine 13 becomes lower, and increases as the target working rotational speed Bs of the working unit 14 becomes lower. Consequently, when the set amount of the target working speed setting section 147 is small, that is, when the target working rotational speed Bs of the working unit 14 is smaller, the minimum limit speed reduction ratio Ram which is regulated by the speed reduction ratio regulation mechanism 90 is larger. Accordingly, even if the rotational speed Er of the engine 13 is abruptly increased by the load abruptly decreasing during work, the working rotational speed Br of the working unit 14 can be restrained from abruptly increasing, because the minimum limit speed reduction ratio Ram is large.

Furthermore, the swing arm 91 can be configured separately from the regulation drive section 110. Accordingly, the regulation drive section 110 can be disposed in a vacant space in the belt-type continuously variable transmission 63, and therefore, the degree of freedom of disposition can be more enhanced. In addition, the regulation adjustment member can be disposed so that an allowable range in which alienation in the axial direction of the movable sheave with respect to the fixed sheave is possible can be adjusted easily and accurately.

Furthermore, the control unit 43 controls the engine 13, the working unit 14 and the speed reduction ratio regulation mechanism 90 on the basis of the respective control modes which are switched by the mode changeover switch 148. Consequently, the worker can make the working content corresponding to preference by optionally selecting the plurality of control modes in accordance with the level of skill of work, and a working situation.

In the present invention, the working machine 10 is not limited to a snowplow, but may be a lawn mower in which the working unit 14 is a lawn mowing cutter blade, for example. Further, the drive source 13 is not limited to an engine, but can be configured by an electric motor, for example.

The working machine 10 of the present invention is suitable to be applied to a snowplow and a lawn mower.

REFERENCE SIGNS LIST

10 Working machine (snowplow)
13 Drive source (engine)
14 Working unit
31 Working power transmission system
41 Engine speed sensor (drive source speed sensor)
43 Control unit
53 Auger
61 Electromagnetic clutch (auger clutch, working unit clutch)
63 Belt-type continuously variable transmission for working machine
72 Drive pulley
74 Driven pulley
75 V-belt
76 Working unit speed sensor
81 Fixed sheave
82 Movable sheave
83 Coil spring
84 Torque cam mechanism
90 Speed reduction ratio regulation mechanism
91 Swing arm
103 Swing angle detection sensor
110 Regulation drive section
112 Electric motor
142 Drive minimum speed setting section (drive source operation member, throttle lever)
147 Target working speed setting section
148 Mode changeover switch
Br Actual working rotational speed of working unit
Bs Target working rotational speed of working unit
Em Target minimum rotational speed of drive source (engine)
Er Actual rotational speed of drive source (engine)
Es Target rotational speed of drive source (engine)
Ra Speed reduction ratio
Ram Minimum limit speed reduction ratio
α Swing angle of swing arm

What is claimed is:

1. A working machine in which a belt-type continuously variable transmission is interposed in a working power transmission system from a drive source to a working unit, and a driven pulley of the belt-type continuously variable transmission includes a fixed sheave, a movable sheave displaceable in an axial direction with respect to the fixed sheave, an urging member that urges the movable sheave toward the fixed sheave, and a torque cam mechanism that converts a part of a rotational force that acts on the movable sheave into a thrust that presses a side surface of a belt, comprising:

a target working speed setting section that sets a target working rotational speed of the working unit;
a working unit speed sensor that detects an actual working rotational speed of the working unit;
a speed reduction ratio regulation mechanism that regulates a minimum speed reduction ratio of a rotational speed of the driven pulley to a drive pulley; and
a control unit that controls the drive source and the speed reduction ratio regulation mechanism,
wherein the control unit is configured to
control a rotational speed of the drive source so as to bring the actual working rotational speed of the working unit detected by the working unit speed sensor close to the target working rotational speed of the working unit,
obtain a minimum limit speed reduction ratio on the basis of a target minimum rotational speed of the drive source, which is set in advance or set by a drive minimum speed setting section, and the target working rotational speed of the working unit, and
control the speed reduction ratio regulation mechanism to keep the obtained minimum limit speed reduction ratio.

2. The working machine according to claim 1, wherein a characteristic of the minimum limit speed reduction ratio is a characteristic that decreases as the target minimum rotational speed of the drive source becomes smaller, and increases as the target working rotational speed of the working unit becomes smaller.

3. The working machine according to claim 2, wherein the speed reduction ratio regulation mechanism has a regulation adjustment member that is displaceable to adjust an allowable range in which alienation in an axial direction of the movable sheave with respect to the fixed sheave is possible, and a regulation drive section that drives the regulation adjustment member, and
the control unit is configured to control the regulation drive section in the speed reduction ratio regulation mechanism.

4. The working machine according to claim 3, further comprising:
a manual type mode changeover switch; and a drive source operation member that manually operates a rotational speed of the drive source,
wherein the control unit is configured to control the drive source, the working unit and the speed reduction ratio regulation mechanism on the basis of a plurality of control modes which are set in advance to be switchable by the mode changeover switch, and
the plurality of control modes include
a first control mode that controls the drive source, the working unit and the speed reduction ratio regulation mechanism by setting of the target working speed setting section, and
a second control mode that controls the rotational speed of the drive source in accordance with an operation amount of the drive source operation member.

5. The working machine according to claim 2, further comprising:
a manual type mode changeover switch; and a drive source operation member that manually operates a rotational speed of the drive source,
wherein the control unit is configured to control the drive source, the working unit and the speed reduction ratio regulation mechanism on the basis of a plurality of control modes which are set in advance to be switchable by the mode changeover switch, and
the plurality of control modes include a first control mode that controls the drive source, the working unit and the speed reduction ratio regulation mechanism by setting of the target working speed setting section, and a second control mode that controls the rotational speed of the drive source in accordance with an operation amount of the drive source operation member.

6. The working machine according to claim 1, wherein the speed reduction ratio regulation mechanism has a regulation adjustment member that is displaceable to adjust an allowable range in which alienation in an axial direction of the movable sheave with respect to the fixed sheave is possible, and a regulation drive section that drives the regulation adjustment member, and the control unit is configured to control the regulation drive section in the speed reduction ratio regulation mechanism.

7. The working machine according to claim 6, further comprising:

a manual type mode changeover switch; and a drive source operation member that manually operates a rotational speed of the drive source, wherein the control unit is configured to control the drive source, the working unit and the speed reduction ratio regulation mechanism on the basis of a plurality of control modes which are set in advance to be switchable by the mode changeover switch, and the plurality of control modes include a first control mode that controls the drive source, the working unit and the speed reduction ratio regulation mechanism by setting of the target working speed setting section, and a second control mode that controls the rotational speed of the drive source in accordance with an operation amount of the drive source operation member.

8. The working machine according to claim 1, further comprising:

a manual type mode changeover switch; and a drive source operation member that manually operates a rotational speed of the drive source, wherein the control unit is configured to control the drive source, the working unit and the speed reduction ratio regulation mechanism on the basis of a plurality of control modes which are set in advance to be switchable by the mode changeover switch, and the plurality of control modes include a first control mode that controls the drive source, the working unit and the speed reduction ratio regulation mechanism by setting of the target working speed setting section, and a second control mode that controls the rotational speed of the drive source in accordance with an operation amount of the drive source operation member.

* * * * *